(12) United States Patent
Knox et al.

(10) Patent No.: US 11,357,356 B2
(45) Date of Patent: Jun. 14, 2022

(54) PORTABLE GRILLING SYSTEM

(71) Applicant: Fire & Flavor Grilling Co., Athens, GA (US)

(72) Inventors: Davis Purcell Knox, Athens, GA (US); Jeffrey Paul Broadrick, Athens, GA (US); Kyle Dean Aasness, Athens, GA (US); David Matthew Williams Hemming, Surprise, AZ (US); Joseph William Pruitt, Athens, GA (US)

(73) Assignee: Fire & Flavor Grilling Co., Athens, GA (US)

( * ) Notice: Subject to any disclaimer, the term of this patent is extended or adjusted under 35 U.S.C. 154(b) by 0 days.

(21) Appl. No.: 17/279,511

(22) PCT Filed: Nov. 26, 2019

(86) PCT No.: PCT/US2019/063192
§ 371 (c)(1),
(2) Date: Mar. 24, 2021

(87) PCT Pub. No.: WO2020/112732
PCT Pub. Date: Jun. 4, 2020

(65) Prior Publication Data
US 2021/0307562 A1 Oct. 7, 2021

Related U.S. Application Data

(60) Provisional application No. 62/773,570, filed on Nov. 30, 2018.

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ............... A47J 37/0763; A47J 2037/0777
See application file for complete search history.

(56) References Cited

U.S. PATENT DOCUMENTS

| | | | |
|---|---|---|---|
| 2,122,275 | A | 6/1938 | Bitney |
| 2,746,378 | A | 5/1956 | Lang |

(Continued)

FOREIGN PATENT DOCUMENTS

| | | |
|---|---|---|
| DE | 202012004383 | 8/2012 |
| EM | 006542577-0001 | 7/2019 |

(Continued)

OTHER PUBLICATIONS

Unigear Faltbar Edelstahl Holz Rucksackreisen Campingkocher, 4 in 1, Available Online at: https://www.amazon.de/Unigear-faltbar-Edelstahl-Rucksackreisen-Campingkocher/dp/B072KGL1H1, Accessed from Internet on Jun. 2, 2020, 6 pages.

(Continued)

*Primary Examiner* — Alfred Basichas
(74) *Attorney, Agent, or Firm* — Kilpatrick Townsend & Stockton LLP

(57) ABSTRACT

A portable grilling system comprising a grate formed of a non-flammable material; at least two support members formed of a non-flammable material and pivotally attached to the grate; at least one fuel insert support member formed of a non-flammable material and positioned below the grate; and a fuel insert comprising a base tray formed of a biodegradable material having a bottom surface and one or more sidewalls extending upwards from the bottom surface; a biodegradable and non-flammable liner positionable within the base tray; and a fuel source positionable within the liner.

20 Claims, 25 Drawing Sheets

(56) References Cited

U.S. PATENT DOCUMENTS

| | | | |
|---|---|---|---|
| 2,780,215 | A | 2/1957 | Vacanti, Jr. |
| 3,028,228 | A | 4/1962 | Chaplin |
| 3,064,637 | A | 11/1962 | Thomson |
| 3,279,900 | A | 10/1966 | Naples |
| 3,306,281 | A | 2/1967 | Hoebel |
| 3,353,527 | A | 11/1967 | Anderson |
| 3,394,693 | A | 7/1968 | Robinson |
| 3,448,735 | A | 6/1969 | Palmer |
| 3,491,743 | A | 1/1970 | Temp |
| 3,610,224 | A * | 10/1971 | Marshall ............ A47J 37/0763 126/19 R |
| 3,682,154 | A | 8/1972 | Mollere |
| 3,828,759 | A | 8/1974 | Cooper |
| 4,530,343 | A | 7/1985 | Beck |
| 4,621,608 | A | 11/1986 | Lee |
| 5,638,743 | A | 6/1997 | Lo |
| 5,785,045 | A | 7/1998 | Chen |
| 6,131,560 | A | 10/2000 | Healy |
| 6,328,028 | B1 | 12/2001 | Cayse et al. |
| D583,613 | S | 12/2008 | Proffitt et al. |
| D657,988 | S | 4/2012 | Chung |
| 8,453,984 | B2 * | 6/2013 | Best ..................... F24C 15/16 248/225.21 |
| D747,910 | S | 1/2016 | Costa et al. |
| 9,370,276 | B2 | 6/2016 | Witzel et al. |
| D798,647 | S | 10/2017 | Chung |
| D801,745 | S | 11/2017 | Costa et al. |
| 10,016,090 | B2 | 7/2018 | Brogger |
| D830,096 | S | 10/2018 | Bucklew et al. |
| D844,363 | S | 4/2019 | Lira-Nunez et al. |
| 10,455,980 | B2 | 10/2019 | Brogger et al. |
| D890,571 | S | 7/2020 | Knox et al. |
| 2004/0112364 | A1 | 6/2004 | Johnson et al. |
| 2008/0159665 | A1 | 7/2008 | Callies |
| 2008/0230045 | A1 | 9/2008 | Bruno |
| 2008/0272263 | A1 * | 11/2008 | Macken ................ E05C 17/047 248/351 |
| 2016/0051088 | A1 | 2/2016 | Brogger |
| 2017/0340167 | A1 | 11/2017 | Chung |
| 2018/0140133 | A1 | 5/2018 | Brogger et al. |
| 2019/0239688 | A1 | 8/2019 | Brogger |
| 2020/0008620 | A1 | 1/2020 | Brogger et al. |

FOREIGN PATENT DOCUMENTS

| | | |
|---|---|---|
| WO | 2016173597 | 11/2016 |
| WO | 2018041312 | 3/2018 |

OTHER PUBLICATIONS

U.S. Appl. No. 29/671,914, Ex Parte Quayle Action mailed on Feb. 20, 2020, 5 pages.

U.S. Appl. No. 29/671,914, Notice of Allowance dated Apr. 17, 2020, 5 pages.

Canada Application No. 187,825, Office Action dated Jun. 18, 2020, 3 pages.

Canada Application No. 187,825, Office Action dated Sep. 15, 2020, 2 pages.

International Application No. PCT/US2019/063192, International Search Report and Written Opinion dated Jun. 19, 2020, 17 pages.

International Application No. PCT/US2019/063192, Invitation to Pay Additional Fees and, Where Applicable, Protest Fee dated Feb. 14, 2020, 11 pages.

International Patent Application No. PCT/US2019/063192, International Preliminary Report on Patentability, dated Jun. 10, 2021, 11 pages.

* cited by examiner

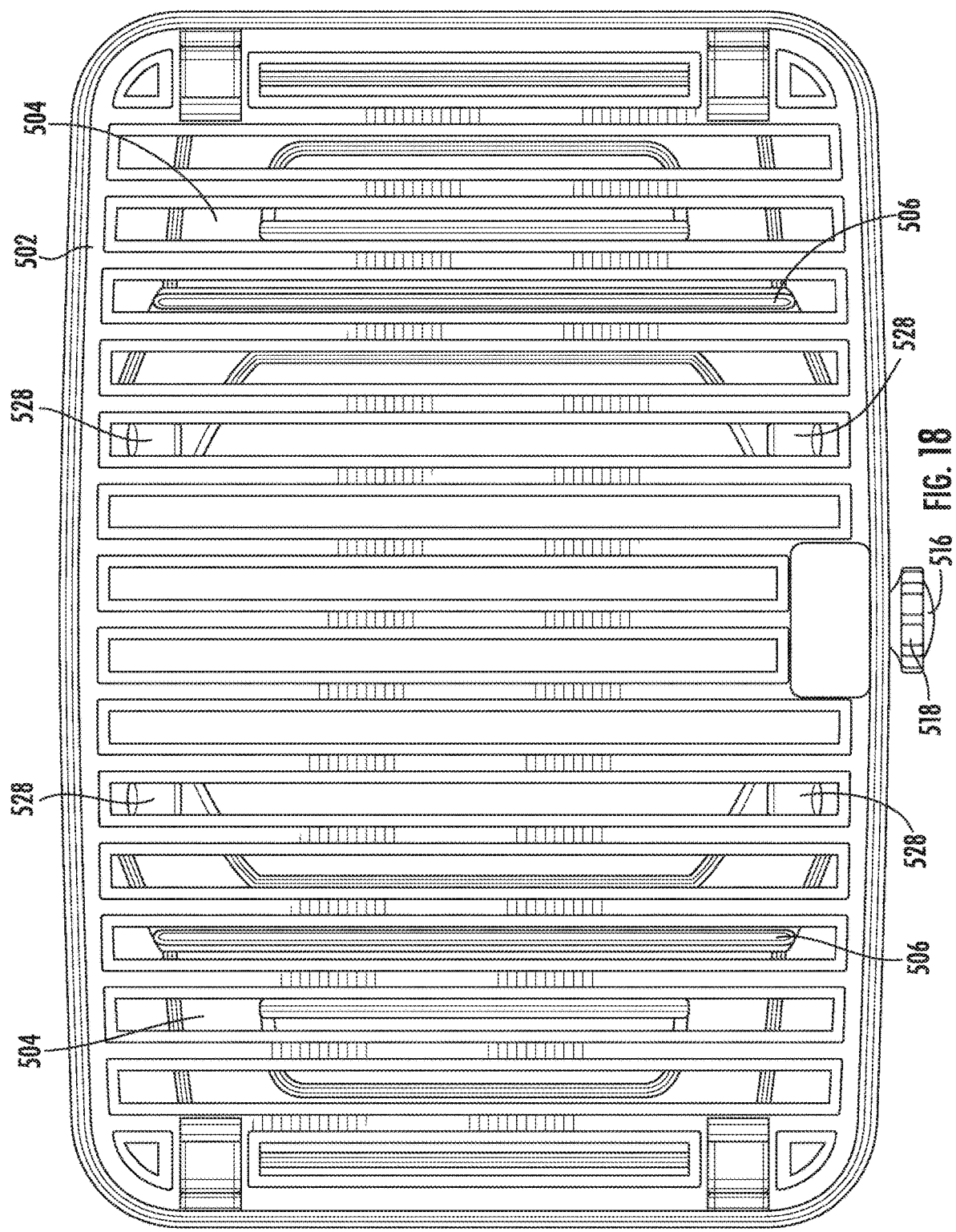

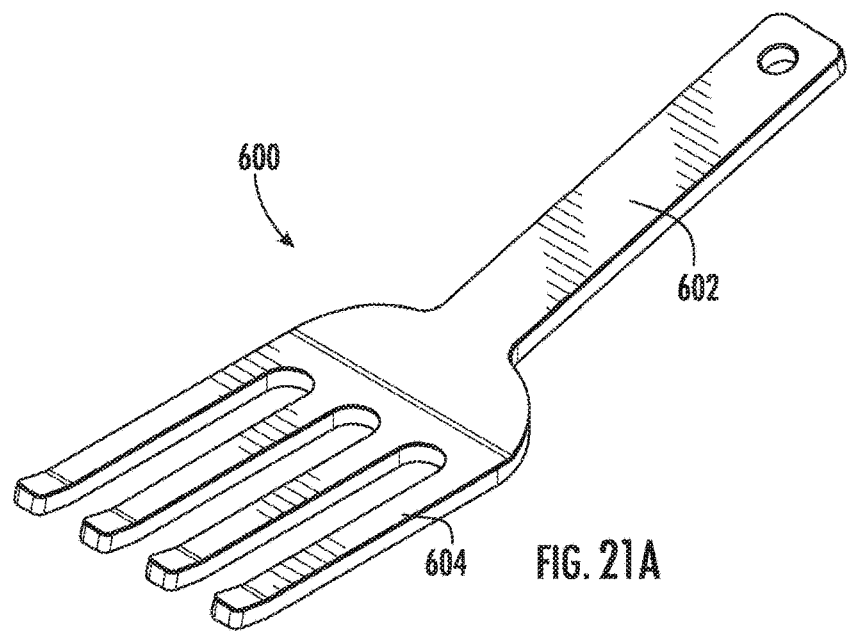
FIG. 21A
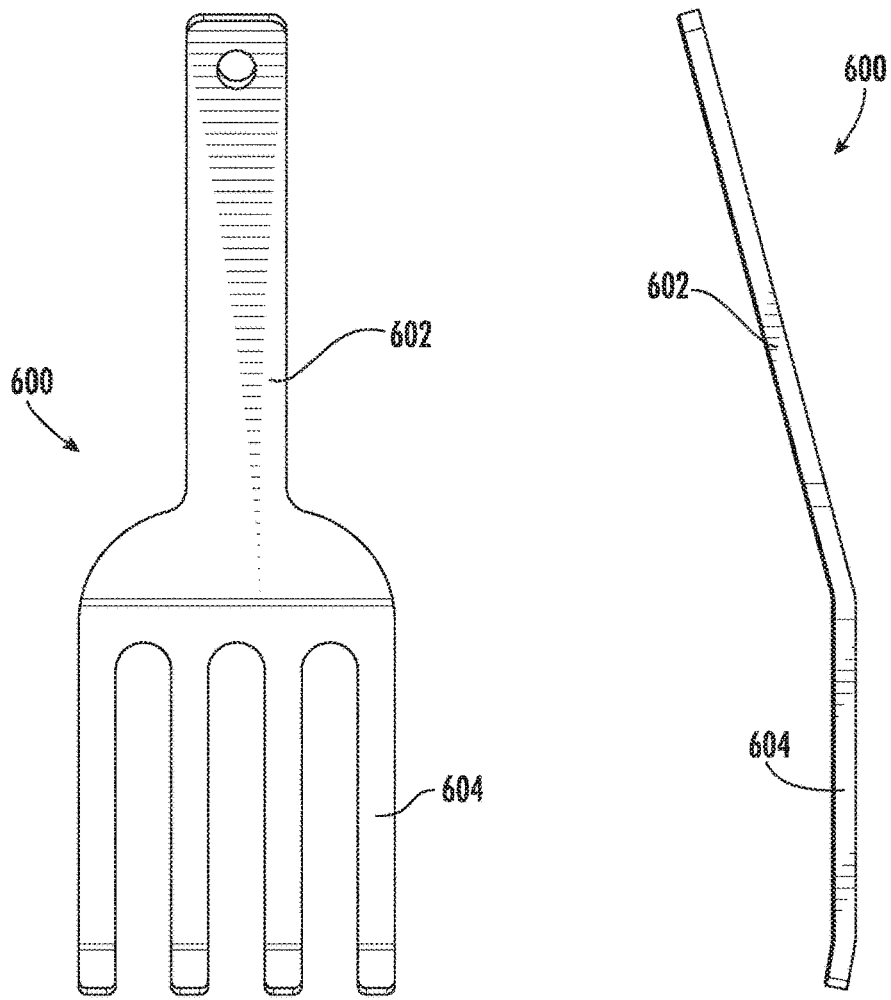
FIG. 21B
FIG. 21C

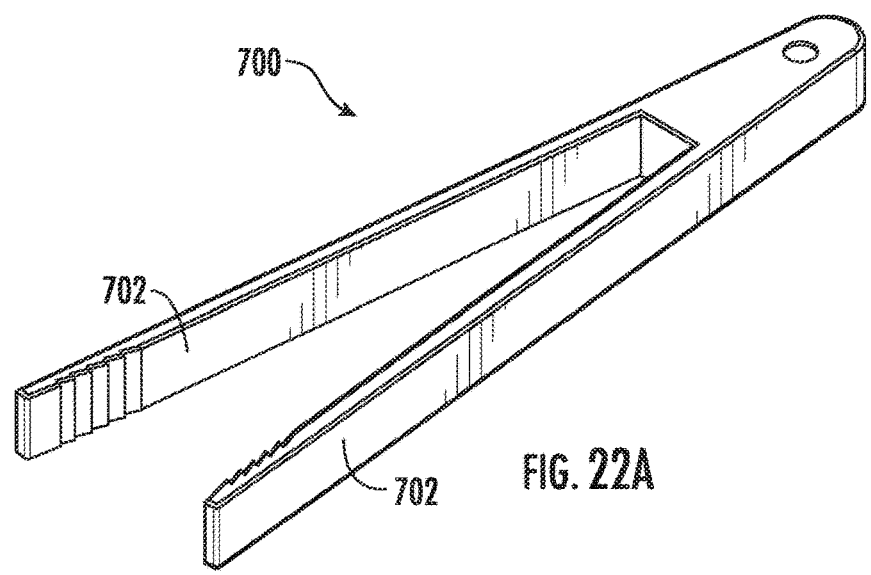
FIG. 22A
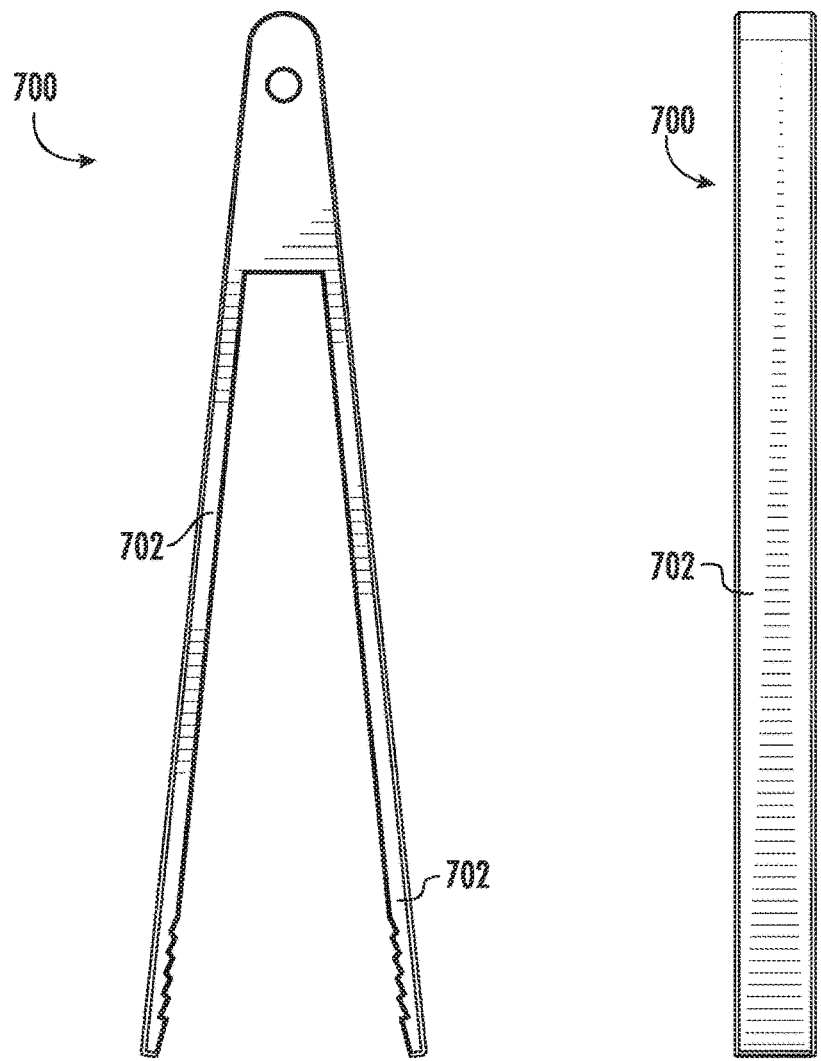 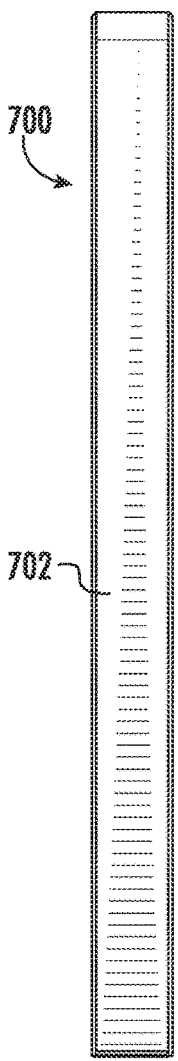
FIG. 22B　　　　FIG. 22C

PORTABLE GRILLING SYSTEM

CROSS REFERENCE TO RELATED APPLICATION

This application is related to and claims priority benefit from U.S. Provisional Application No. 62/773,570 ("the '570 application"), filed on Nov. 30, 2018, and entitled "PORTABLE GRILLING SYSTEM." The '570 application is hereby incorporated in its entirety by this reference.

FIELD OF THE INVENTION

The invention relates to a portable system for grilling using a reusable grill grate and grill grate support members with a biodegradable fuel source insert.

BACKGROUND

Grilling food can be a daunting and stressful task for an inexperienced griller. For example, an inexperienced griller might not know the correct amount or type of fuel to use, the safest way to light the fuel, the proper temperature to cook the selected food, or the proper method for cleaning the grill after its use. Not knowing these elements of grilling may lead to accidents or injury of the griller, ill-prepared food, and damage to the grill itself. Additionally, a typical grill may be too large and bulky to easily and cleanly move it to various locations, like camp sites, tailgates, or parks, or use for cooking on a regular basis due to the hassle of cleaning the grill and the fuel after the user has finished cooking on the grill.

BRIEF DESCRIPTION OF THE DRAWINGS

FIG. 18 is a top view of the portable grilling system of FIG. 16 in the stowed position.

FIG. 21A is a perspective view of a spatula usable with the portable grilling systems of FIGS. 1-20C and FIGS. 24-26.

FIG. 21B is a front view of the spatula of FIG. 21A.

FIG. 21C is a side view of the spatula of FIG. 21A.

FIG. 22A is a perspective view of a pair of tongs usable with the portable grilling systems of FIGS. 1-20C and FIGS. 24-26.

FIG. 22B is a front view of the pair of tongs of FIG. 22A.

FIG. 22C is a side view of the pair of tongs of FIG. 22A.

DETAILED DESCRIPTION

Figure 1:
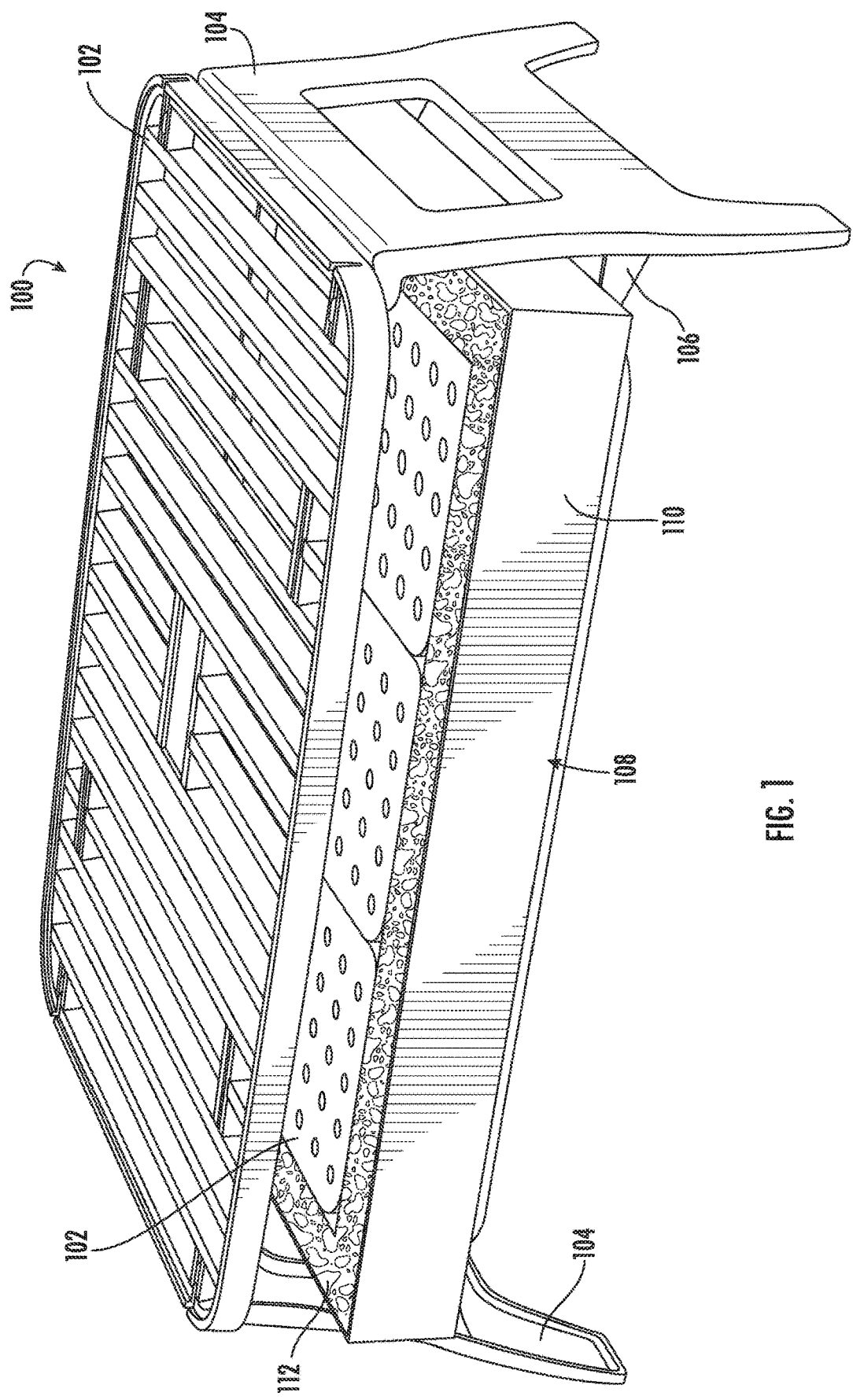
FIG. 1 is a perspective view of a portable grilling system, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-26 illustrate certain embodiments of a portable grilling system. In some of these embodiments, the portable grilling system 100 comprises a grate 102, at least two support members 104, at least one fuel insert support member 106, and a fuel insert 108.

Figure 2:
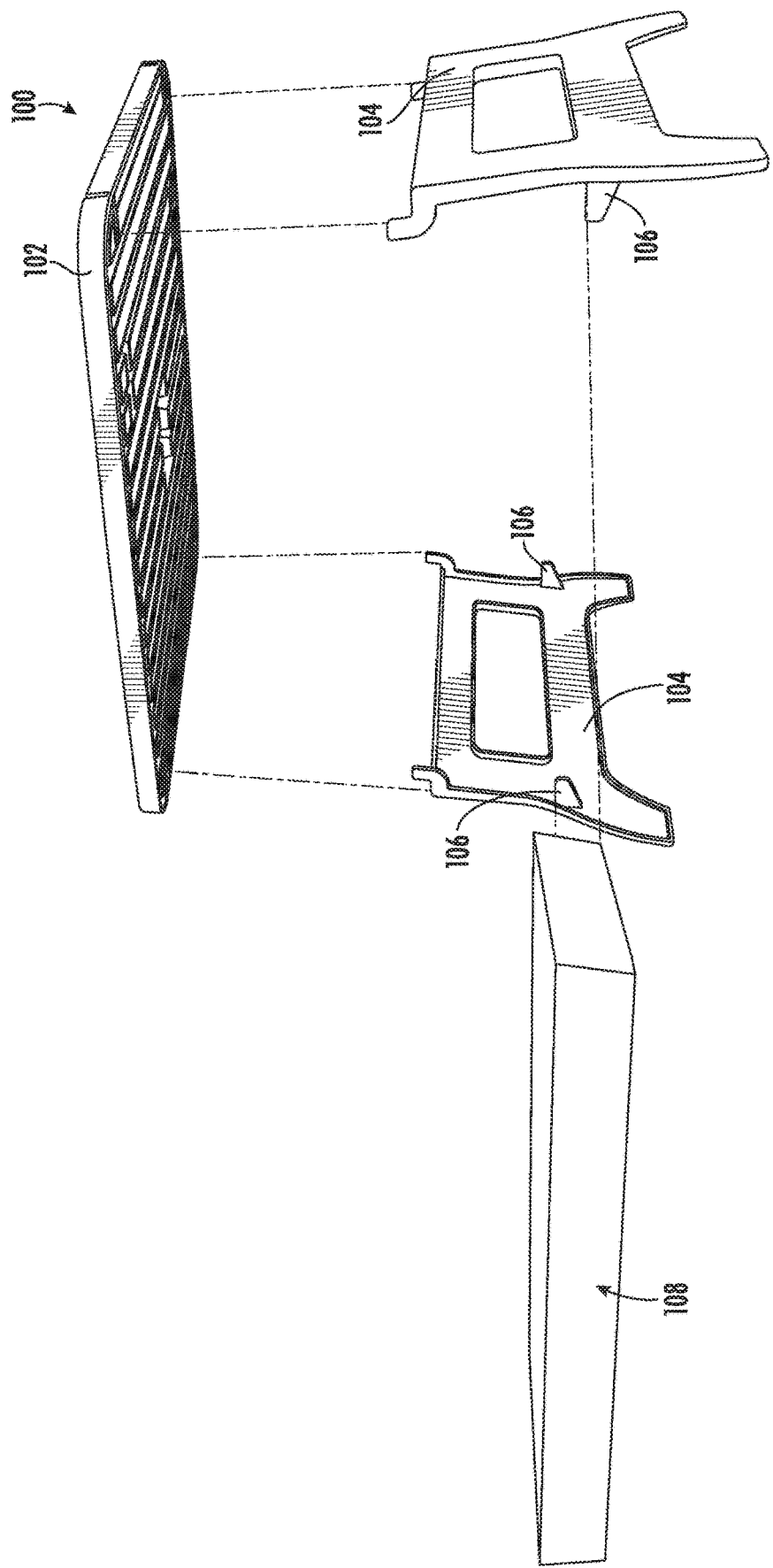
FIG. 2 is an exploded perspective view of the portable grilling system of FIG. 1.
Figure 3:
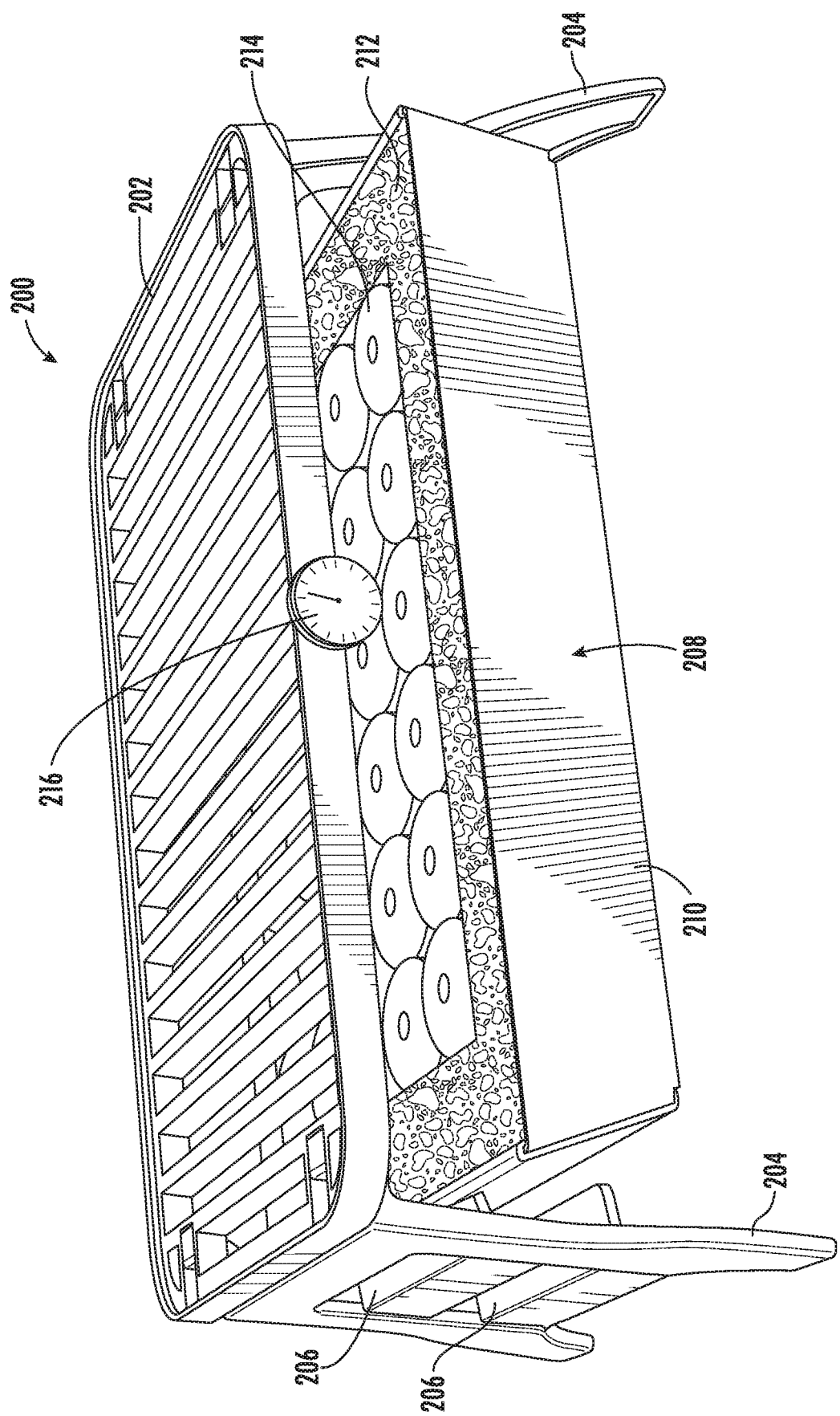
FIG. 3 is a perspective view of a portable grilling system with a thermometer, according to certain embodiments of the present invention.
Figure 4:
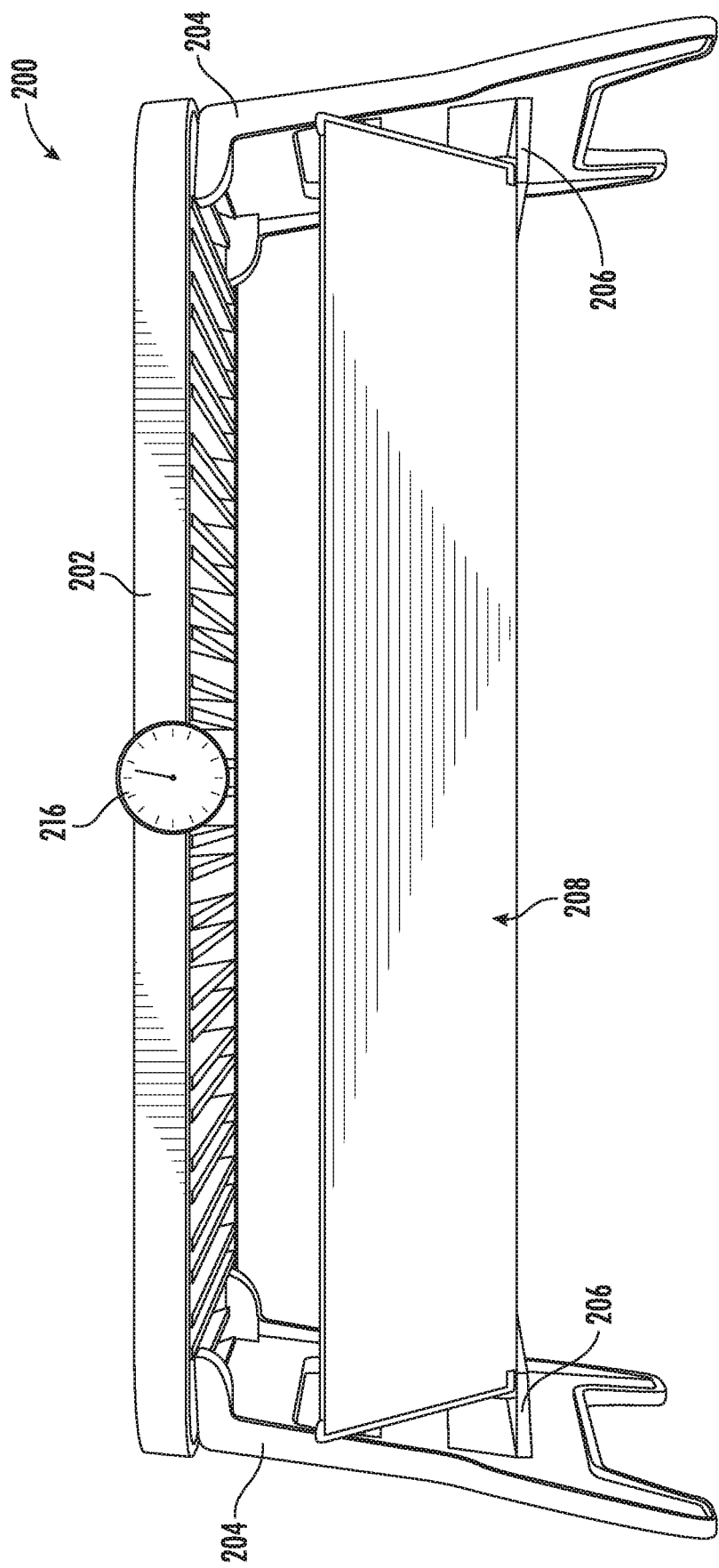
FIG. 4 is a front view of the portable grilling system of FIG. 3.
Figure 5:
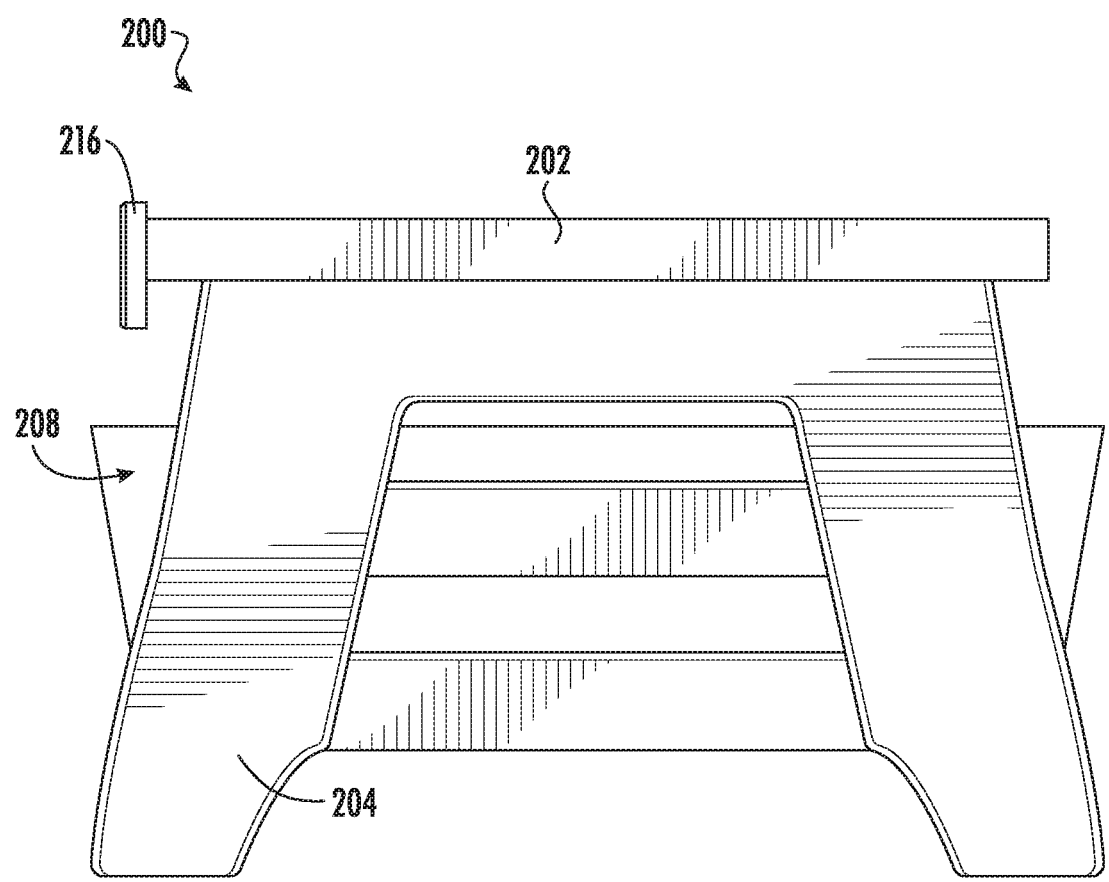
FIG. 5 is a side view of the portable grilling system of FIG. 3.
Figure 6:
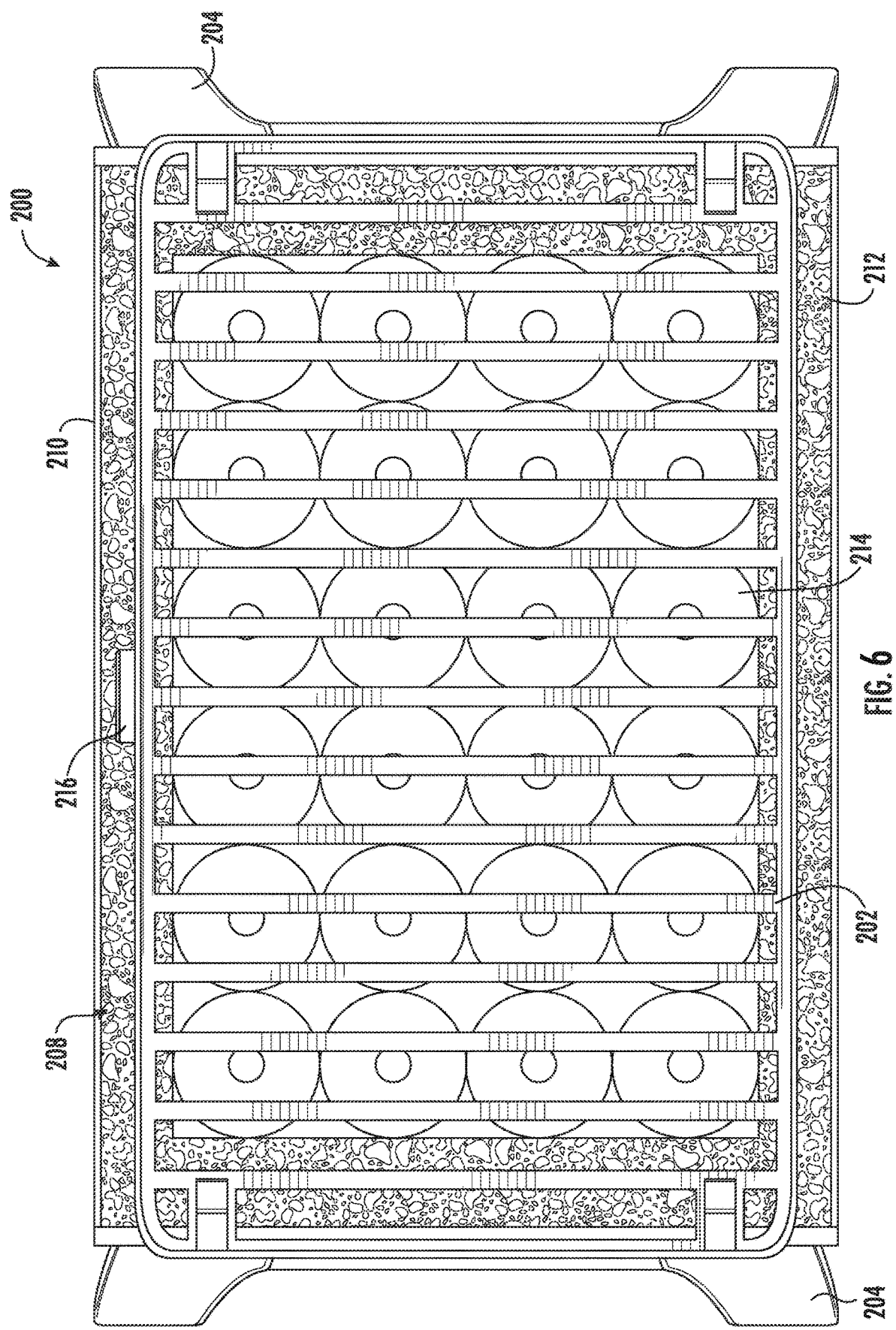
FIG. 6 is a top view of the portable grilling system of FIG. 3.

In some embodiments, as best illustrated in FIGS. 1 and 2, the grate 102 may be constructed of a rigid, non-flammable material such as aluminum or any other suitable material that can withstand temperatures above approximately 500° F. Additionally, the grate 102 may be coated with a non-stick material such as polytetrafluoroethene, matte ceramic, or any other suitable material. After the portable grilling system 100 has been used, as described in more detail below, the grate 102 may be cleaned by pouring water over the grate 102, even while the grate 102 is still hot, and wiping the grate 102 with a soft rag or other non-abrasive item. Because the water passes through the grate 102 and falls into the fuel insert 108, cleaning the portable grilling system 100 using water will not cause the grill to rust. In certain cases, the grate 102 coating may withstand at least 25 uses and/or cleanings without any fatigue or failure of the coating, more specifically may withstand at least 50 uses and/or cleanings without any fatigue or failure of the coating, more specifically may withstand at least 100 uses and/or cleanings without any fatigue or failure of the coating, more specifically may withstand at least 250 uses and/or cleanings without any fatigue or failure of the coating, more specifically may withstand at least 500 uses and/or cleanings without any fatigue or failure of the coating, and more specifically may withstand at least 750 uses and/or cleanings without any fatigue or failure of the coating.

The grate 102 may be rectangular-shaped, rectangular-shaped with rounded corners, circular-shaped, ovular-shaped, or any other suitable shape.

In some embodiments, the grate 102 may include an aperture 220 configured to accept a thermometer 216, which will be discussed below in reference to FIG. 7.

Figure 24:
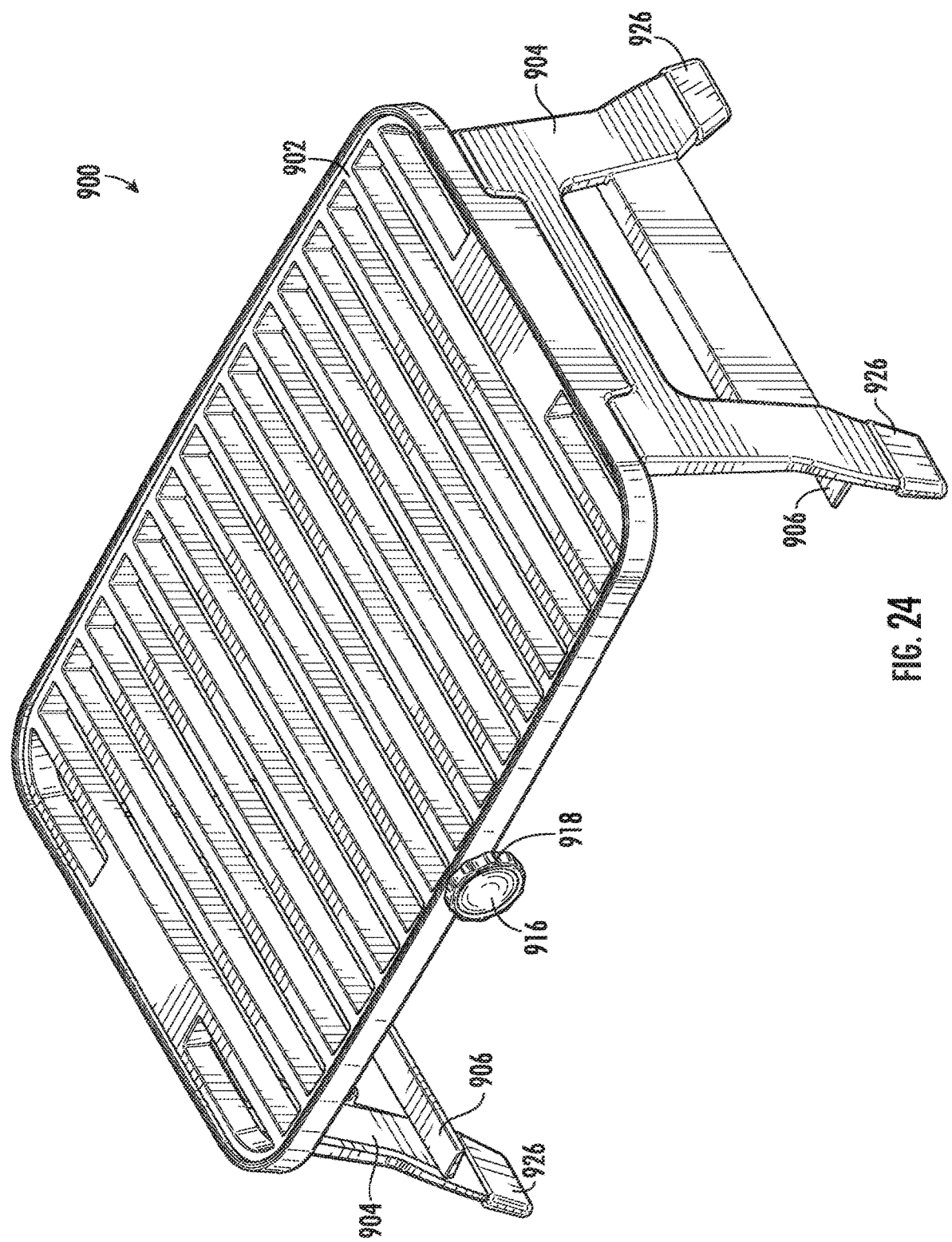
FIG. 24 is a top perspective view of a portable grilling system, according to certain embodiments of the present invention.
Figure 25:
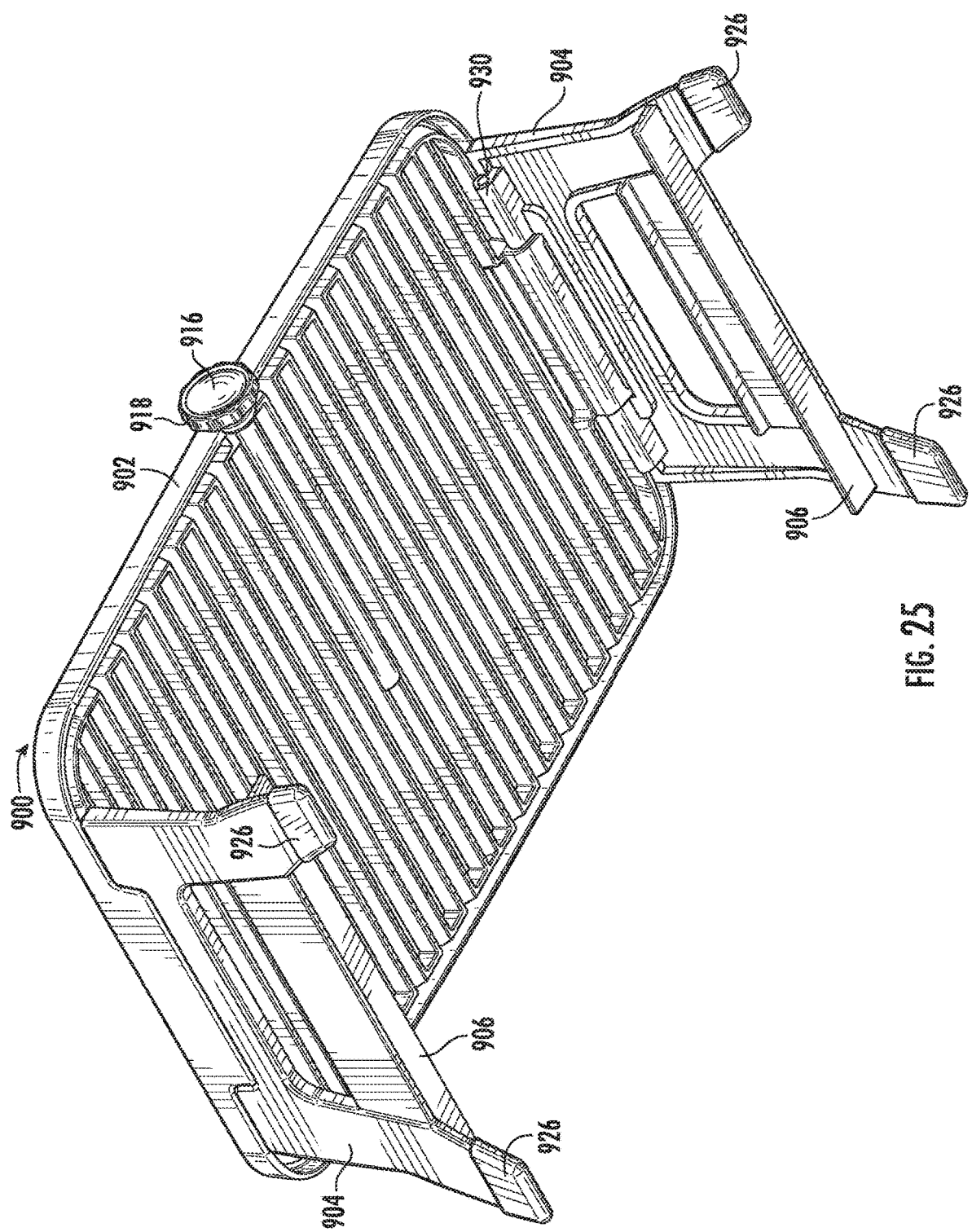
FIG. 25 is a bottom perspective view of the portable grilling system of FIG. 24.
Figure 26:
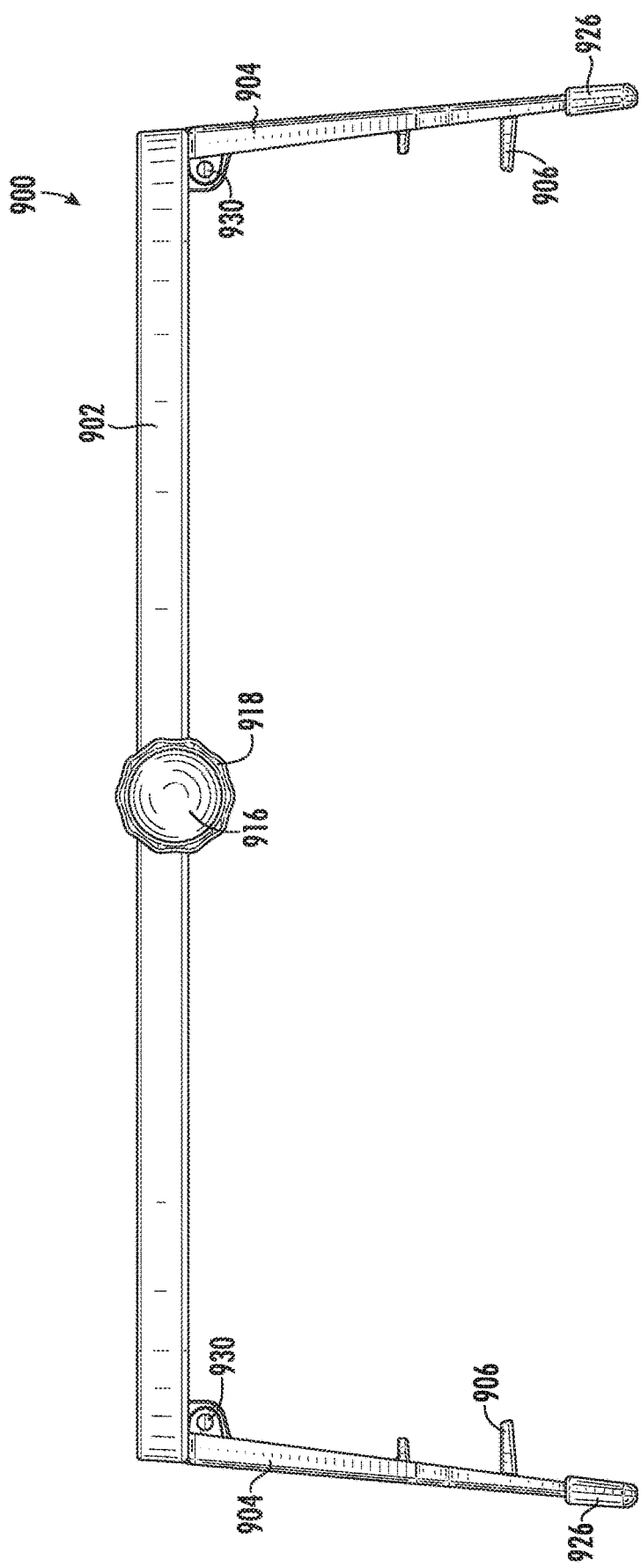
FIG. 26 is a front view of the portable grilling system of FIG. 24.

In some embodiments, the portable grilling system 100 may include at least two support members 104 that may be releasably attachable to the grate 102. The at least two support members 104 may also be pivotally attached to the grate 102. For example, the at least two support members 904 may be pivotally attached to the grate 902 using a hinge connection 930, as best illustrated in FIGS. 24-26. The hinge connection 930 may be formed integrally with the at least two support members 904 and the grate 902 such that a rod, a pin, or any other suitable connection device may extend through portions of the at least two support members 904 and the grate 902 to permit the at least two support member 904 to rotate relative to the grate 902, as best illustrated in FIG. 25. The hinge connection 930 may extend across the entirety of the width of the grate 902, the entirety of the width of the at least two support members 904, or a partial width of the grate 902 and the at least two support members 904. In some embodiments, the hinge connection 930 may be a separate component that is coupled to the at least two support members 904 and the grate 902 to pivotally attach the at least two support members 904 to the grate 902. Referring back to FIG. 1, any other suitable pivotable mechanism may be used to pivotally attach the at least two support members 104 to the grate 102.

The at least two support members 104 may attach to the grate 102 at opposing ends of the grate 102 to support the grate 102. The at least two support members 104 may be formed from the same material, such as aluminum, as the grate 102 or may be formed from a different suitable material. In some embodiments, the at least two support members 104 may be vertically adjustable such that the height of the portable grilling system 100 may be adjusted. Additionally, the at least two support members 104 may include foot caps 526, which will be discussed below in reference to FIGS. 11 and 12.

In some embodiments, the portable grilling system 100 may include at least one fuel insert support member 106 to support the fuel insert 108 above a ground surface and at a distance from the grate 102. For example, the at least one fuel insert support member 106 may include a set of pegs extending from each of the at least two support members 104 underneath the grate 102. The at least one fuel insert support member 106 may be formed integrally with or may be separately attachable to the at least two support members 104 so that the at least one fuel insert support member 106 is positioned below the grate 102. One of skill in the art will understand that the at least one fuel insert support member 106 may be constructed from the same or different material as both the at least two support members 104 and the grate 102. Moveable fuel insert support members 106 or multiple fuel insert support members 106 may be attached to the at least two support members 104, as will be discussed below in reference to FIGS. 3-4 and 7-10.

In some embodiments, the portable grilling system 100 may include a fuel insert 108. The fuel insert 108 may be configured to provide heat to the portable grilling system 100. The fuel insert 108 may include a base tray 110, a liner 112, and a fuel source 114. Additionally, the fuel insert 108 may serve as a catch tray for any drippings or food pieces that fall through the grate 102 while cooking on the portable grilling system 100 or for water or any other cleaning substances used to clean the portable grilling system 100 after the user is done cooking, which may also assist with the biodegrading of the fuel insert 108. Catching water poured over the grate 102 while cleaning the portable grilling system 100 may also serve to help extinguish the fuel source 114 after use.

In some embodiments, the base tray 110 may be formed of a biodegradable material such as cardboard, corrugated cardboard, corrugated fiberboard, or any other suitable material. The base tray 110 may have a bottom surface and one or more sidewalls extending upwards from the bottom surface. In some embodiments, the base tray 110 may be any suitable size and shape to fit securely between the at least two support members underneath the grate 102. The secure fit of the base tray 110 and the fuel insert 108 may assist in providing stability to the portable grilling system 100.

In some embodiments, the liner 112 may be formed of perlite or any other suitable biodegradable and non-flammable material that is able to be in close contact with the fuel source 114. The liner 112 may extend across the entire bottom surface of the base tray 110 and up the one or more sidewalls forming a cavity that may be located beneath the grate 102 when the fuel insert is placed in the portable grilling system 100.

In some embodiments, the fuel source 114 may be positionable within the liner 112. For example, the fuel source 114 may be placed in the cavity of the liner 112 so that the liner 112 surrounds the lower and side surfaces of the fuel source 114. The fuel source 114 may be charcoal, charcoal briquettes, wood pucks, wood chips, or any other suitable material for heating the portable grilling system 100. However, a person of skill in the relevant art will understand that the fuel source 114 may be any mixture of the charcoal, charcoal briquettes, wood, or other suitable materials in order to reach a specific cooking temperature or create different flavors in the food cooked on the portable grilling system 100. Additionally, a user may selectively remove individual pieces of the fuel source 114 from the fuel insert 108 to adjust the cooking temperature or change the size of the cooking area based on the type of item to be grilled.

In some embodiments, the fuel source 114 is configured in the fuel insert 108 so as to heat the grate 102 to a temperature of at least 400° F. within five to ten minutes of igniting the fuel source 114. In further embodiments, the fuel source 114 may be configured in the fuel insert 108 so as to heat the grate 102 to a temperature of between 325° F.-500° F., more specifically between 400° F.-450° F., more specifically within 450° F.-500° F., more specifically within 425° F.-475° F., more specifically within 425° F.-450° F., more specifically within 450° F.-475° F., more specifically within 325° F.-400° F., more specifically within 325° F.-375° F., more specifically within 325° F.-350° F., more specifically within 350° F.-400° F., more specifically within 350° F.-375° F., and more specifically within 375° F.-400° F. within five to ten minutes of igniting the fuel source 114. Furthermore, the fuel insert 108 may maintain the temperature within the stated range for at least 20 minutes, more specifically for at least 30 minutes, more specifically for at least 1 hour, more specifically for at least 1.5 hours, more specifically for at least 2 hours, more specifically for at least 2.5 hours, and more specifically for at least 3 hours. The fuel source may be ignited by lighting a single charcoal briquette or by lighting multiple charcoal briquettes.

As best illustrated in FIGS. 3-8, the portable grilling system 200 may include the same or similar elements as discussed above such as a grate 202, at least two support members 204, at least one fuel insert support member 206, and a fuel insert 208. However, a person of skill in the art will understand that the portable grilling system 200 may include any combination or variation of the elements discussed above or may include additional elements. For example, the at least one fuel insert support member 206 may include multiple shelf-like extensions extending across a portion of the at least two support members 204. These multiple shelf-like extensions permit the fuel insert 208 to be placed below the grate 202 at varying distances from the grate 202 and allow a user to have greater control of the temperature.

Additionally, a thermometer 216 may be incorporated into the portable grilling system 200 to assist the user in cooking food. The thermometer 216 may be inserted into the grate 202, as discussed below in reference to FIG. 7, or may be attached to the grate 202 or portable grilling system 200 in any suitable manner. The thermometer 216 may be configured to communicate with a separate computing device via wired or wireless communication. For example, the thermometer 216 may be connected to communicate with a cellphone, a laptop, a tablet, a smartwatch, or any other suitable device via Bluetooth or other wireless communication methods in order to share temperature readings of the portable grilling system 200 or the food cooked on the portable grilling system 200, depending on the location of the thermometer 216.

Figure 7:
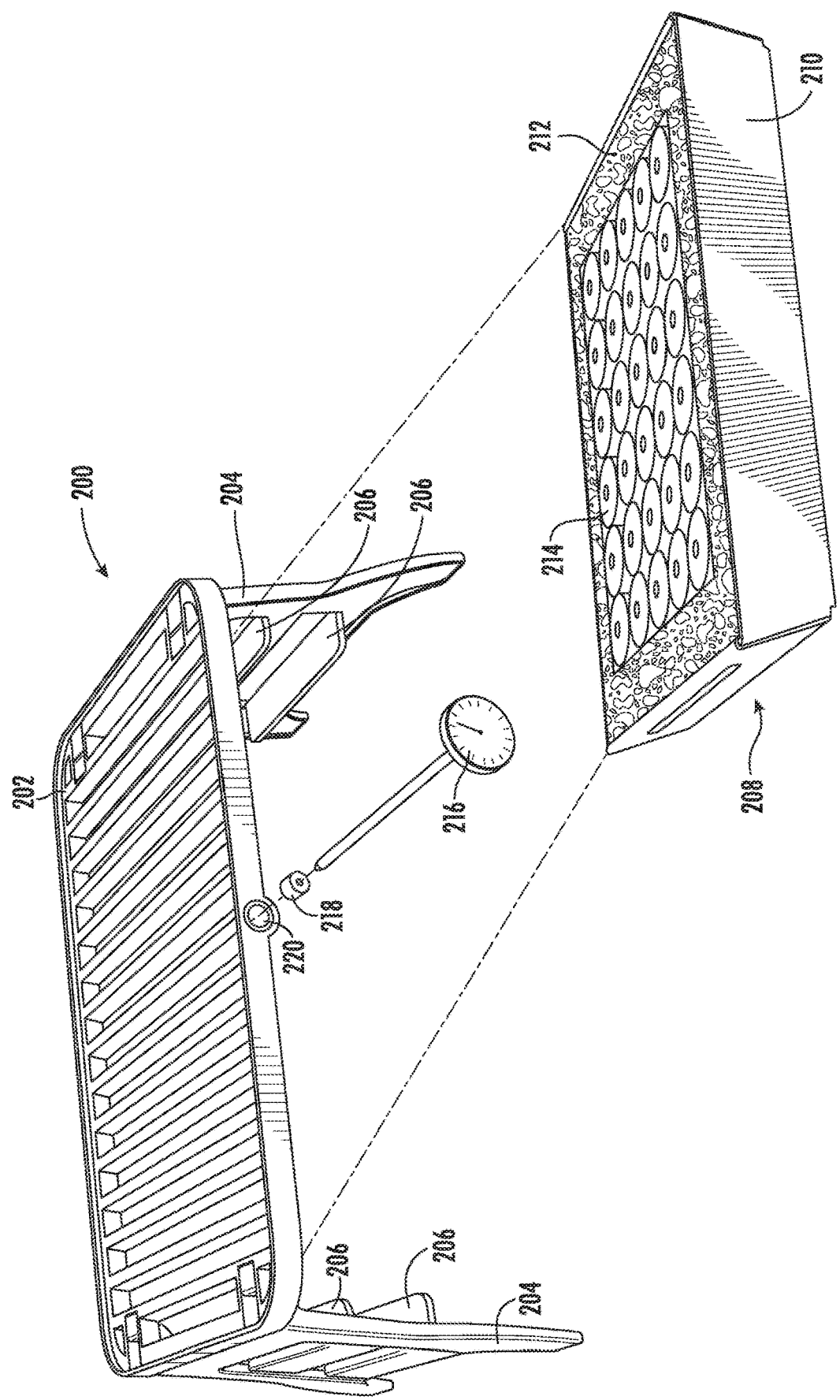
FIG. 7 is an exploded perspective view of the portable grilling system of FIG. 3.

In some embodiments, as best illustrated in FIG. 7, the grate 202 may include an aperture 220 that extends partially or entirely through one of the cross members of the grate 202. The thermometer 216 may be inserted into the aperture 220 in order to measure the temperature of the grate 202 to allow for more accurate cooking. The thermometer 216 may also be used to measure the temperature of the grate 202 to inform the user of when the grate 202 reaches a temperature that is safe to handle. The aperture 220 may be sized to securely receive the thermometer 216 itself or to securely receive a sleeve 218. The thermometer 216 may then be inserted into the aperture 220 through the sleeve 218 to provide a friction fit between the thermometer 216 and the grate 202 in order to prevent accidental slippage between the thermometer 216 and the grate 202. In some embodiments, the sleeve 218 may be cylindrically shaped. In further embodiments, the sleeve 218 may extend into the aperture 220 and around the gauge of the thermometer 216, as described below in reference to FIGS. 11 and 12. The sleeve 218 may be made from rubber, silicone, plastic, thermoplastic rubber, thermoplastic elastomer, or urethane. However, one of skill in the art will understand that the sleeve 218 may be made from any material that is pliable, non-scratch, capable of providing a gripping texture, and has a melting temperature above approximately 500° F.

Figure 8:
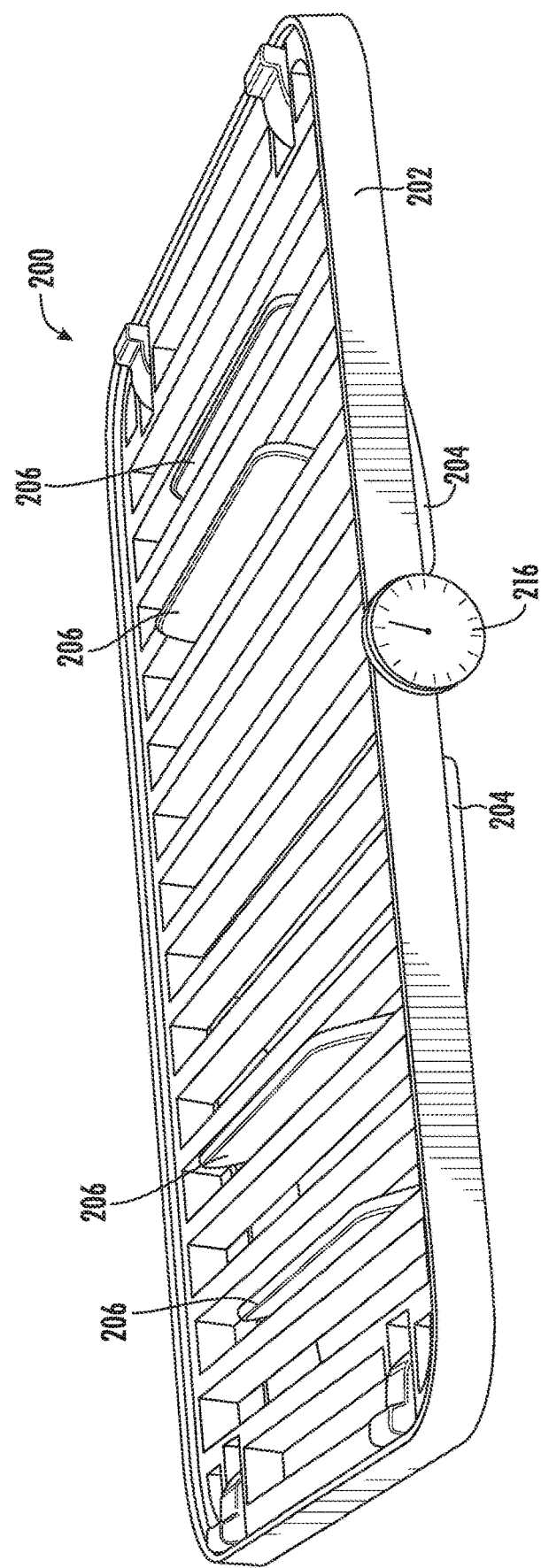
FIG. 8 is a perspective view of the portable grilling system of FIG. 3 in a stowed position.

As best illustrated in FIG. 8, the portable grilling system 200 may include a stowed position. In the stowed position, the at least two support members 204 may pivot from a deployed position, where the at least two support members 204 are oriented substantially orthogonal to the grate 202 so that the at least two support members 204 are oriented substantially parallel to a lower surface of the grate 202. The at least one fuel insert support member 206 may extend through the cross members of the grate 202 so that the at least one fuel insert support member 206 nests within the opening in the grate 202. In some embodiments, the fuel insert 208 may be enclosed within a package prior to use. After the fuel insert 208 has been removed from the package and used with the portable grilling system 200, the grate 202, the at least two support members 204, and the at least one fuel insert support member may be folded together to the stowed position and inserted into the package for storage until the next use of the portable grilling system 200.

Figure 9:
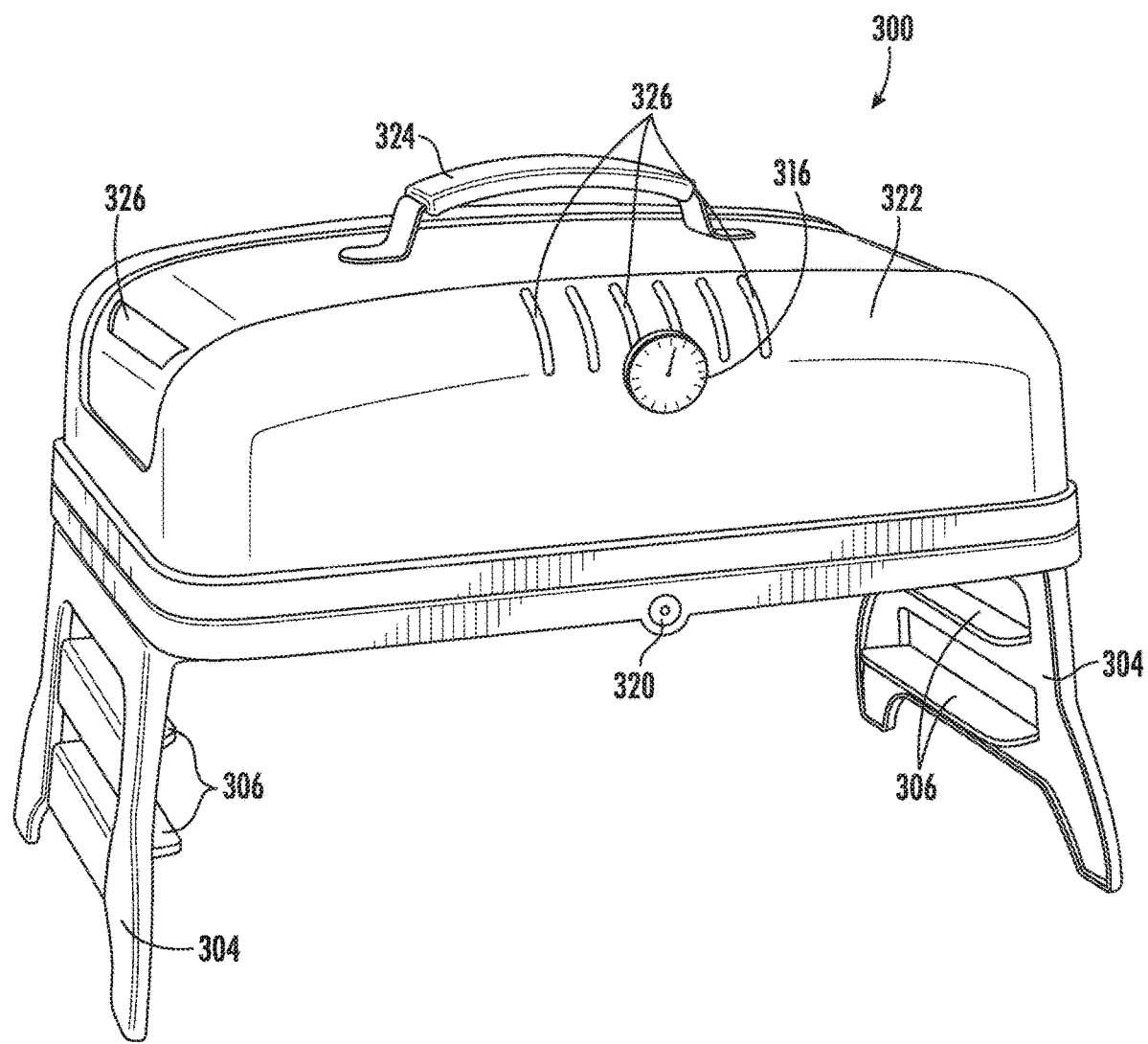
FIG. 9 is a perspective view of a portable grilling system with a lid, according to certain embodiments of the present invention.

In some embodiments, as best illustrated in FIG. 9, the portable grilling system 300 may include the same or similar elements as discussed above such as a grate 302, at least two support members 304, at least one fuel insert support member 306, and a fuel insert 308. Additionally, the portable grilling system 300 may include a removable lid 322. The lid 322 may be formed from the same material, such as aluminum, as the grate 302 and the at least two support members 304, or the lid 322, the grate 302, and the at least two support members 304 may be formed from different types of material. A person of skill in the art would understand that the lid 322 may be formed from any suitable, non-flammable material. The lid 322 may be shaped and sized to fit securely over the top of the grate 302 so that the lid 322 may be positioned to substantially enclose an upper surface of the grate 302.

The lid 322 may include a variety of features including a thermometer 316, a handle 324, and at least one lid aperture 326. The thermometer 316 may be formed integrally with the lid 322 or may be inserted into an appropriately sized opening in the lid 322. For example, the thermometer 316 may be sized to fit into both the aperture 320 in the grate 302 and the opening in the lid 322 so that the temperature of the grate 302 and the dome of the lid 322 may be measured by moving the thermometer 316 between the aperture 320 in the grate 302 and the opening in the lid 322. Additionally, the thermometer 316 may be inserted into the food being cooked in the portable grilling system 300 to measure the temperature of the food.

In some embodiments, the handle 324 may be formed integrally with the lid 322 or may be separately attachable to the lid 322. For example, the handle 324 may be attached to an upper surface of the lid 322 to permit the user to easily and safely remove the lid 322 from the grate 302. The lid 322 may also include at least one lid aperture 326 to permit smoke to escape from the lid 322. The at least one lid aperture 326 may be located at one end of the lid 322, at one side of the lid 322, at an upper surface of the lid 322, or in any combination of these locations. Additionally, the at least one lid aperture 326 may include a sliding member to permit the user to open, close, or partially open or close the at least one lid aperture 326.

Figure 10:
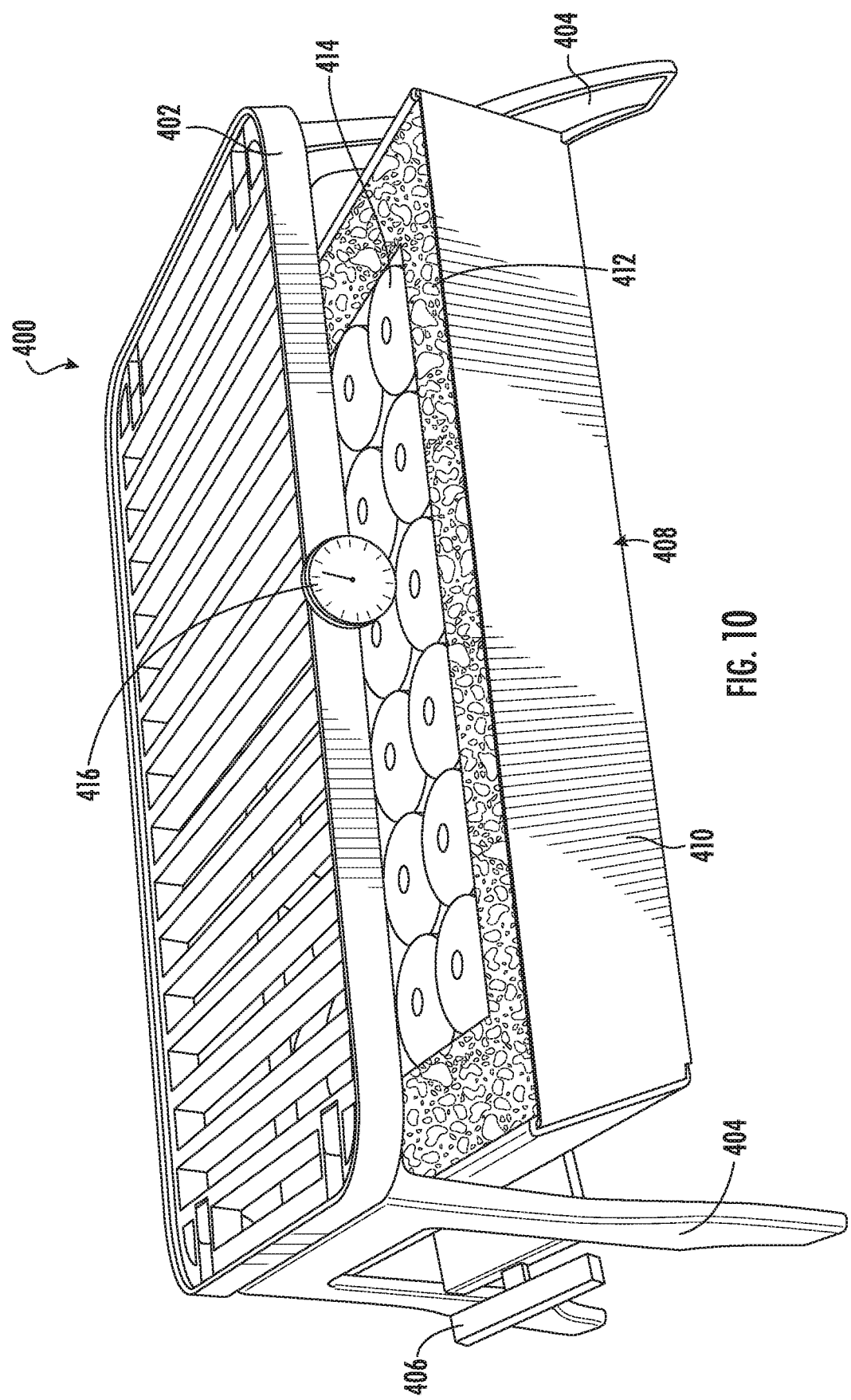
FIG. 10 is a perspective view of a portable grilling system with adjustable fuel insert support members, according to certain embodiments of the present invention.

As best illustrated in FIG. 10, the portable grilling system 400 may include the same or similar elements as discussed above such as a grate 402, at least two support members 404, at least one fuel insert support member 406, and a fuel insert 408. In some embodiments, the at least one fuel insert support member 406 may be moveable such that the distance between the grate 402 and the at least one fuel insert support member 406 is adjustable. In further embodiments, the at least one fuel insert support member 406 may include a series of slots that enable the at least one fuel insert support member 406 to be adjusted. In still further embodiments, the at least one fuel insert support member 406 may include a sliding pin and slot that enable the at least one fuel insert support member 406 to be adjusted. The adjustability of the at least one fuel insert support member 406 permits the user to adjust the distance between the grate 402 and the fuel insert 408 based on the type of food to be cooked in the portable grilling system 400. Additionally, the height, or thickness, of the fuel insert 408, including the height, or thickness, of the fuel source 414, may be adjusted to change the distance between the grate 402 and the top surface of the fuel source 414. For example, the height of the fuel insert 408 and the fuel source 414 may be increased so that the distance between the grate 402 and the top surface of the fuel source 414 is decreased. Decreasing the distance between the grate 402 and the top surface of the fuel source 414 may permit the grate 402 to reach a higher temperature.

Figure 14:
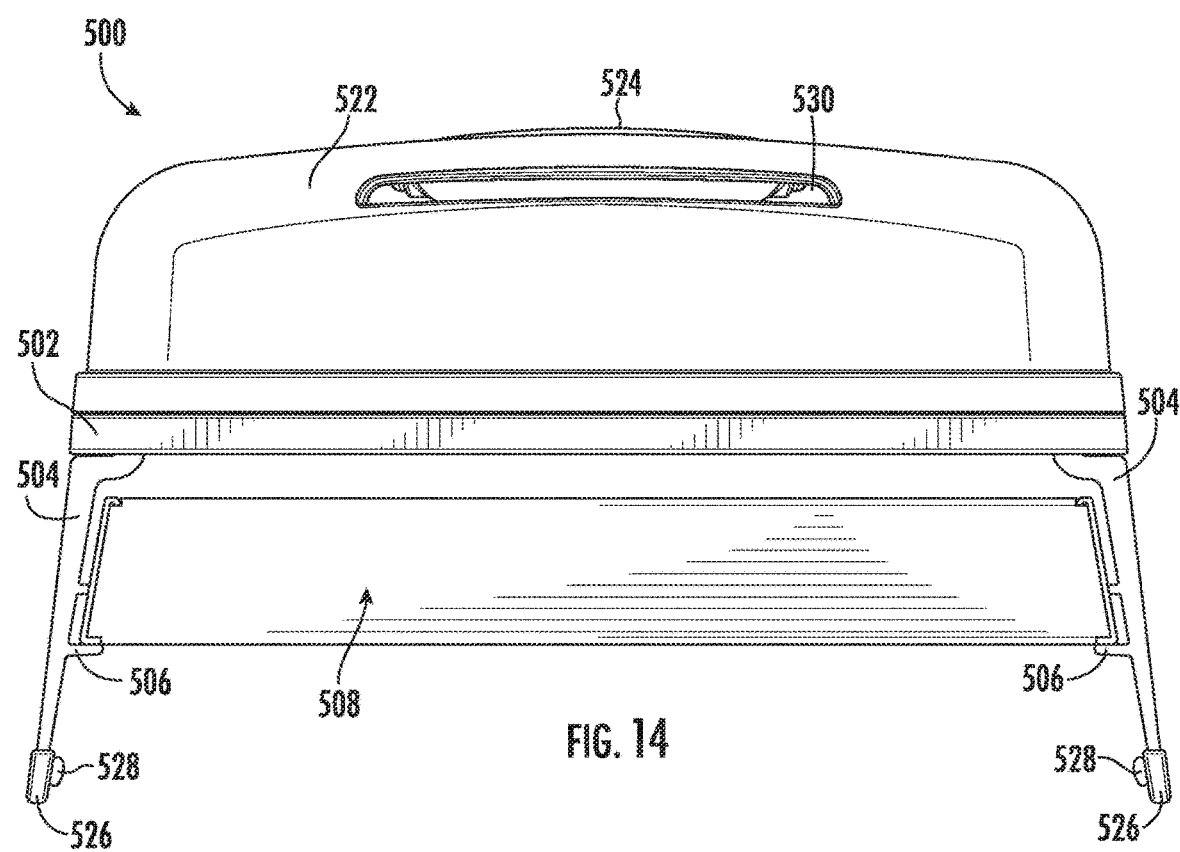
FIG. 14 is a rear view of the portable grilling system of FIG. 11.
Figure 15:
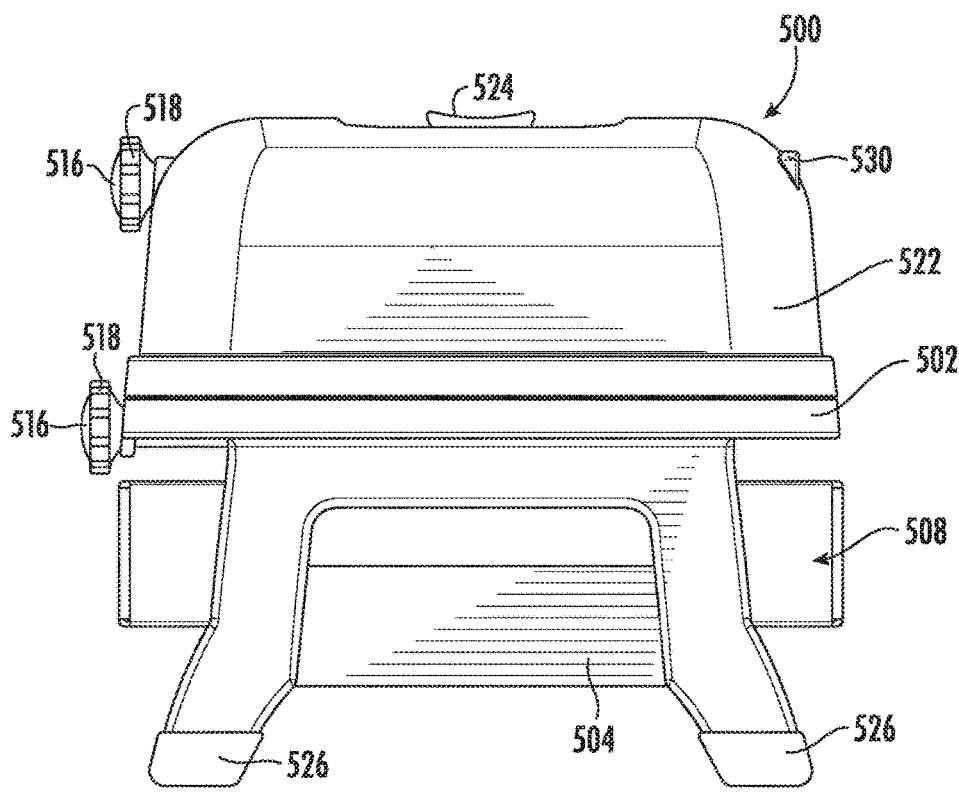
FIG. 15 is a side view of the portable grilling system of FIG. 11.
Figure 16:
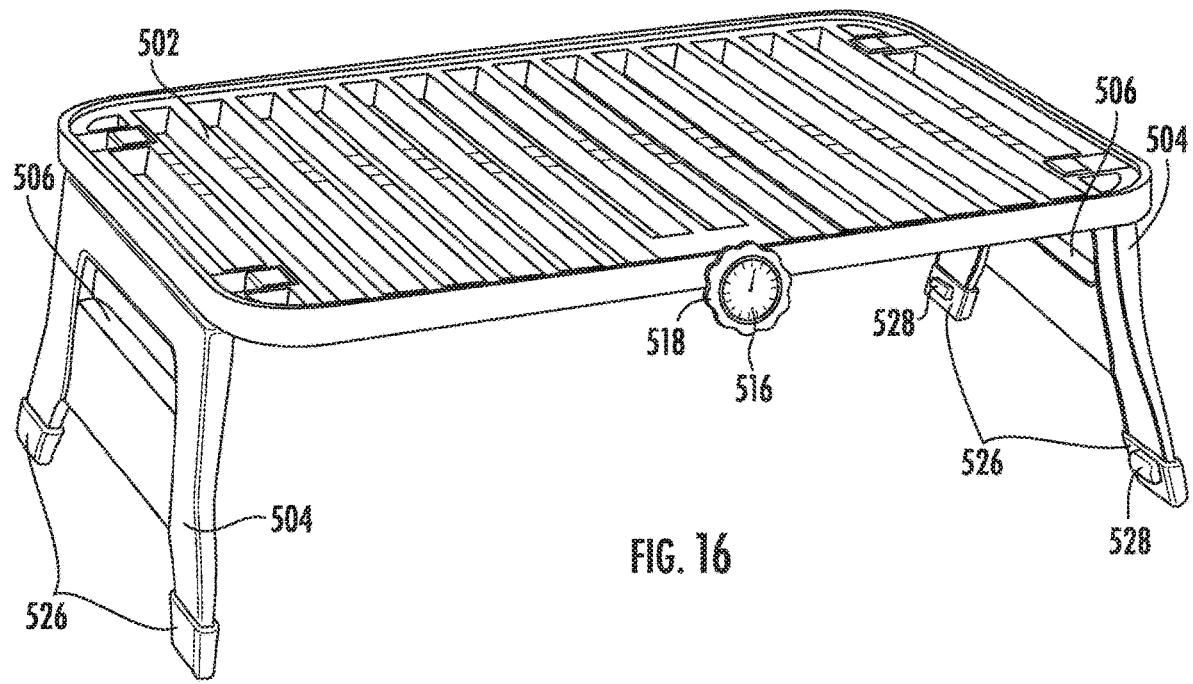
FIG. 16 is a perspective view of the portable grilling system of FIG. 11 without the fuel insert or lid.

In some embodiments, as best illustrated in FIG. 11-17, the portable grilling system 500 may include the same or similar elements as discussed above such as a grate 502, at least two support members 504, at least one fuel insert support member 506, a fuel insert 508, and a lid 522. For example, the lid 522 may include a handle 524 to permit the user to easily remove the lid 522 from the grate 502 during use. However, the handle 524 may be positioned in a recess of the lid 522 to minimize the amount of space the lid 522 occupies when the portable grilling system 500 is being stored. The lid 522 may also include at least one lid aperture 530 to permit smoke to escape from the lid 522. The at least one lid aperture 530 may be located at one end of the lid 522, at one side of the lid 522, at an upper surface of the lid 522 (as best illustrated in FIG. 14), or in any combination of these locations. Additionally, the at least one lid aperture 530 may include a sliding member to permit the user to open, close, or partially open or close the at least one lid aperture 530.

Figure 11:
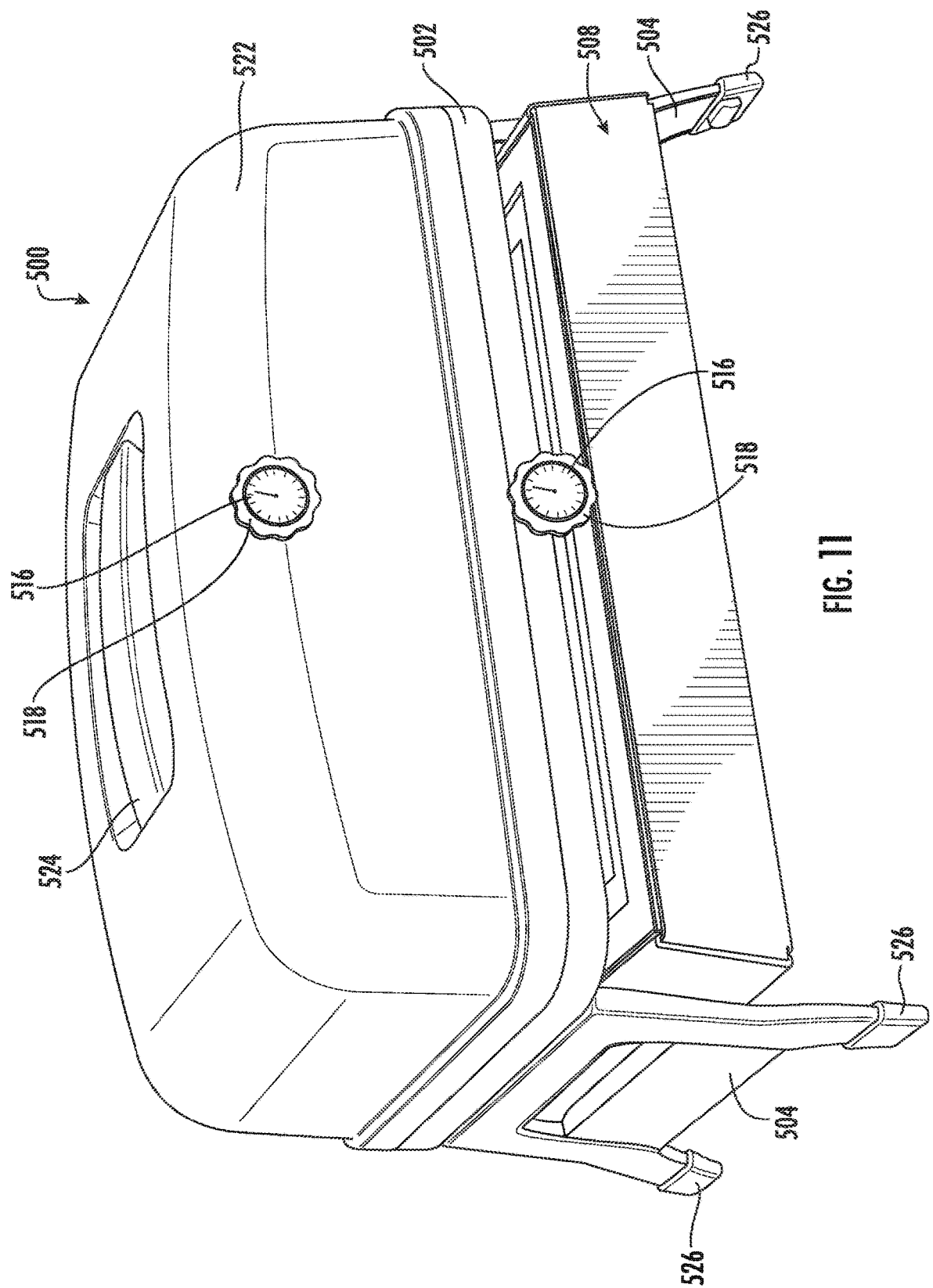
FIG. 11 is a perspective view of a portable grilling system with a lid with a recessed handle, foot caps, and an interlocking design between the fuel insert and the support legs, according to certain embodiments of the present invention.
Figure 12:
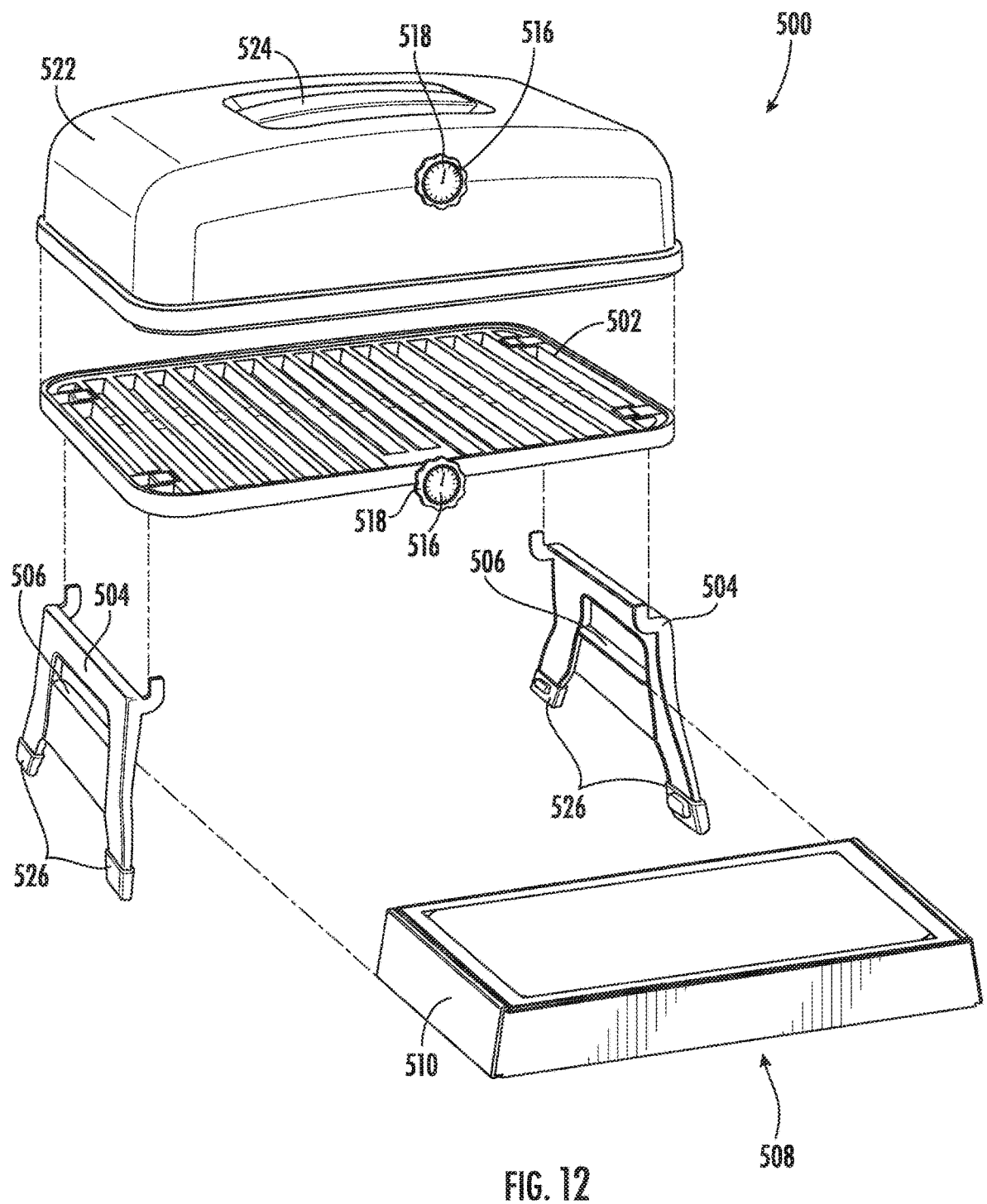
FIG. 12 is an exploded perspective view of the portable grilling system of FIG. 11.
Figure 13:
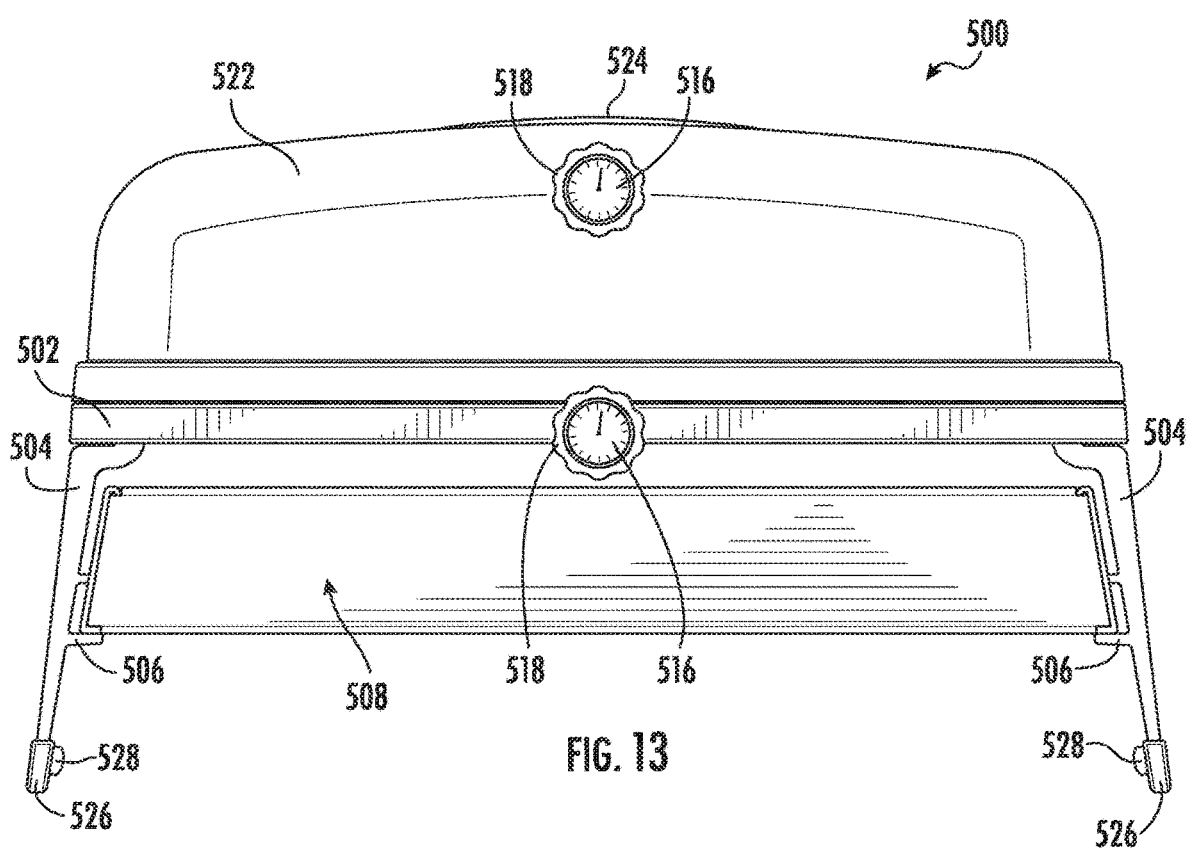
FIG. 13 is a front view of the portable grilling system of FIG. 11.

As best illustrated in FIGS. 11 and 12, a foot cap 526 may be positioned over an end surface of the at least two support members 504 to minimize accidental movement or sliding of the portable grilling system 500 when the at least two support members 504 are in the deployed position during use. The foot cap 526 may be made from rubber, silicone, plastic, thermoplastic rubber, thermoplastic elastomer, or urethane. However, one of skill in the art will understand that the foot cap 526 may be made from any material that is pliable, non-scratch, capable of providing a gripping texture, and/or has a melting temperature above approximately 500° F. In some embodiments, the sleeve 218 and the foot cap 526 may be made from the same or different materials. Additionally, the end surfaces of the support members 504 may include a projection 528 to increase a grip between the at least two support members 504 and the grate 502 when the at least two support members 504 are folded into the stowed position, which will be discussed below in relation to FIG. 18. As such, the foot caps 526 are shaped to receive the projections 528 when they are placed over the end surfaces of the support members 504.

Figure 17:
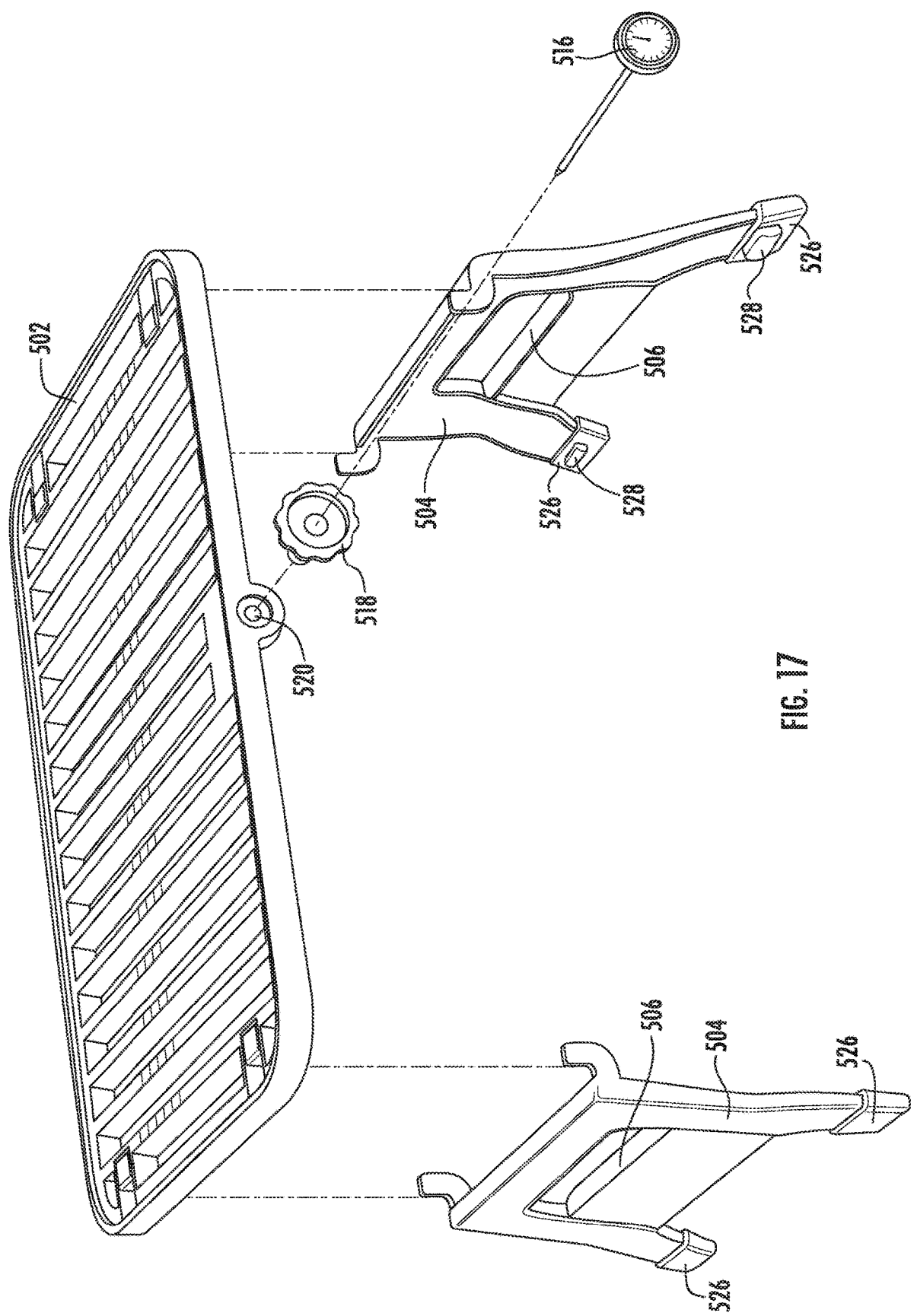
FIG. 17 is an exploded perspective view of the portable grilling system of FIG. 16.

In some embodiments, as best illustrated in FIG. 17, the sleeve 518 may be shaped such that it extends over the thermometer 516 gauge and neck. This protects the user from injuring himself or herself by touching a hot surface of the thermometer 516. Additionally, the sleeve 518 may include an extended portion that is sized to abut the aperture 520 but has a dimension that is larger than a dimension of the aperture 520 so as to prevent the sleeve 518 from being inserted into the aperture 520. As a result, the gauge of the thermometer 516 may be spaced away from the grate 502 by the length of the extended portion of the sleeve 518, which may be approximately ¼ to ½ inch. This distance between the thermometer 516 gauge and the edge of the grate 502 may prevent the user from inadvertently touching the hot surface of the grate 502 when removing the thermometer 516 from the grate 502.

In some embodiments, as best illustrated in FIG. 18, the foot caps 526 may include the projections 528 that create a friction fit between the projections 528 of the foot caps 526 and the cross members of the grate 502. The projections 528 may extend into the space between two cross members of the grate 502. The projections 528 serve to increase the friction grip between the foot caps 526 and the grate 502 to assist in securing the at least two support members 504 in the stowed position.

Figure 19A:
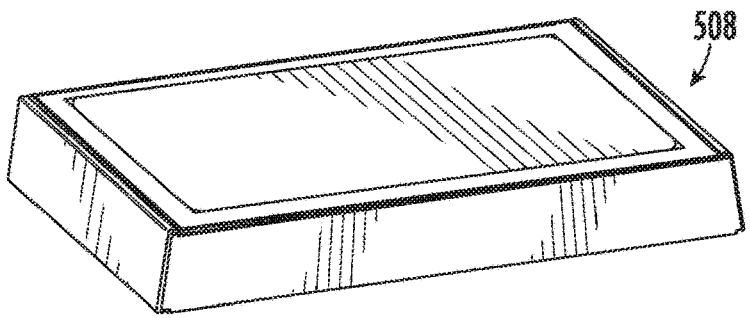
FIG. 19A is a perspective view of the fuel insert of FIG. 11 with a self-enclosed lid.
Figure 19B:
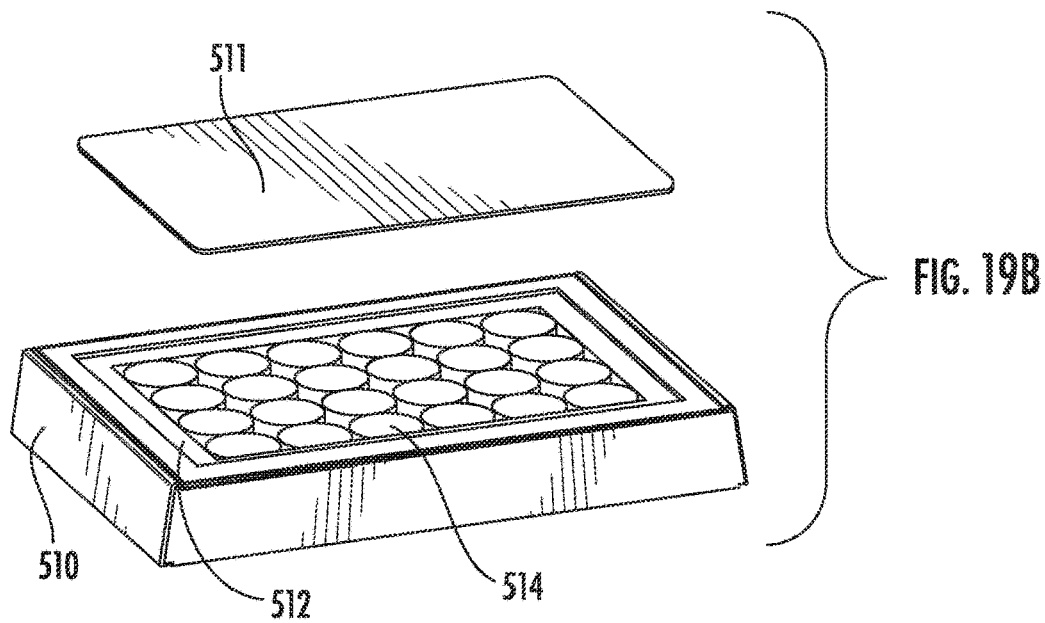
FIG. 19B is an exploded perspective view of the fuel insert of FIG. 19A with a self-enclosed lid.
Figure 19C:
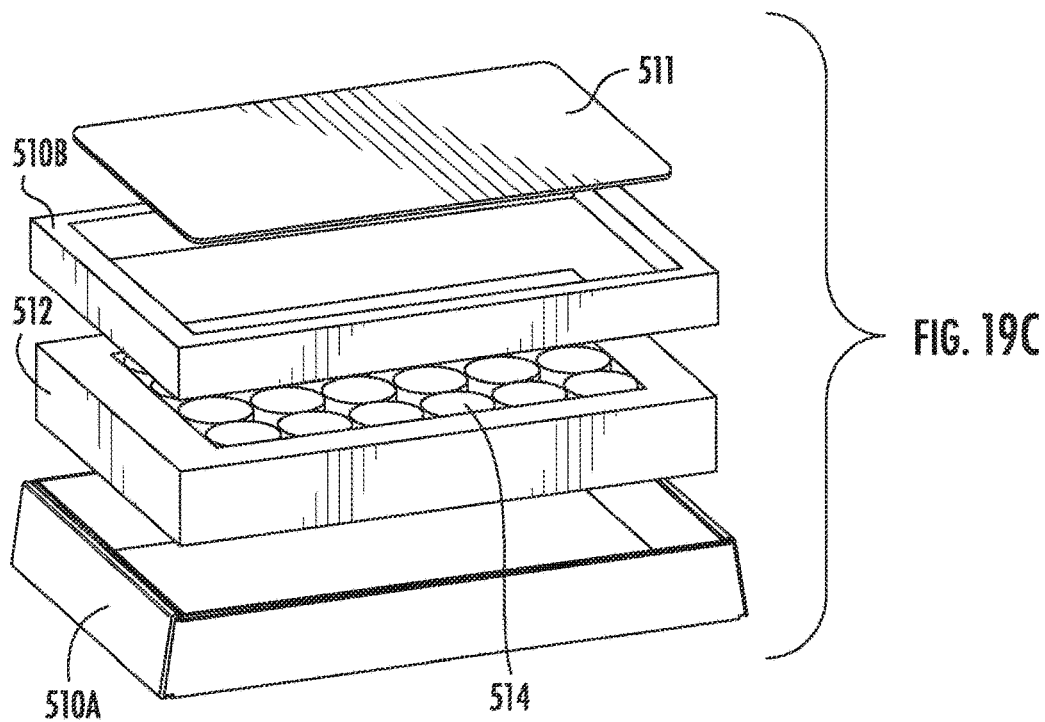
FIG. 19C is another exploded perspective view of the fuel insert of FIG. 19A with a self-enclosed lid.

In some embodiments, as best illustrated in FIGS. 19A-19C, the fuel insert 508 may include the same or similar elements as discussed above such as a base tray 510, a liner 512, and a fuel source 514. Additionally, fuel insert 508 may include a self-enclosed lid 511 that remains in place until removed by the user. The self-enclosed lid 511 may be formed by creating a partially perforated or tear-ready area in an upper surface of a fully enclosed base tray 510. This area may then be opened by pulling a tab or other means to grip the area, and removing the self-enclosed lid 511, which would create an opening in the base tray 510. The self-enclosed lid 511 may also be formed by attaching a plastic, cellophane, or transparent or translucent material to a pre-formed opening in the base tray 510.

Once the self-enclosed lid 511 is removed, a spill lip may remain as part of the base tray 510 and surrounds an edge of the top of the fuel insert 508. For example, the spill lip may cover the edge of the liner 112 so as to assist in keeping the material that forms the liner 112 from spilling out of the fuel insert 508. The spill lip may also give the fuel insert 508 a cleaner, more finished look. However, in some embodiments, the base tray 510 may not include a spill lip.

The opening, whether pre-formed in the self-enclosed lid 511 or created when the self-enclosed lid 511 is removed, may be any suitable size to allow a regular arrangement of individual components that make up the fuel source 514. For example, the individual components may be arranged in regular patterns of rows and columns that include any suitable combination of individual components, including but not limited to a row and column (or column and row) arrangement of 4×6, 4×7, 4×8, 4×9, 4×10, 4×5, 4×4, 4×3, 4×2, 4×1, 5×5, 5×6, 5×7, 5×8, 5×9, 5×10, 5×3, 5×2, 5×1, 6×6, 6×7, 6×8, 6×9, 6×10, 6×3, 6×2, 6×1 or any number of individual components arranged in a regular or irregular pattern within the liner 112. Furthermore, the individual components may be arranged in a single layer or multiple layers within the liner 112.

Figure 20A:
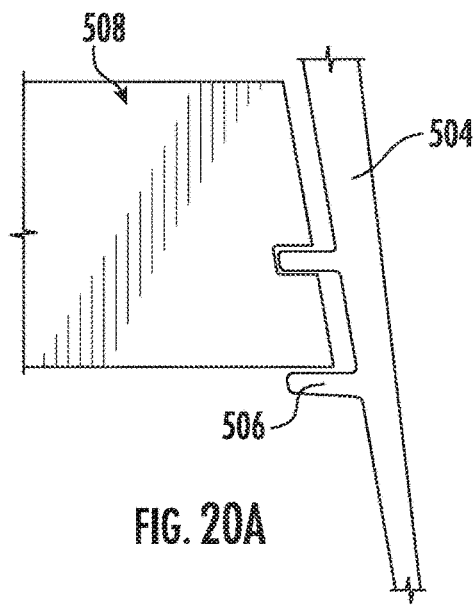
FIG. 20A is a partial side view of an interlocking design between the fuel insert and one of the support legs of the portable grilling system of FIG. 11.
Figure 20B:
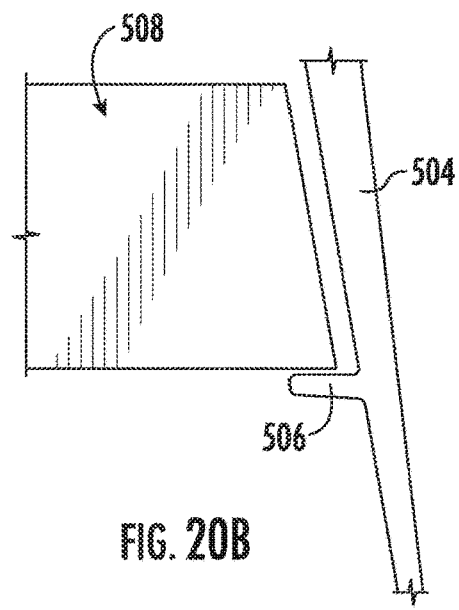
FIG. 20B is a partial side view of another interlocking design between the fuel insert and one of the support legs of the portable grilling system of FIG. 11.
Figure 20C:
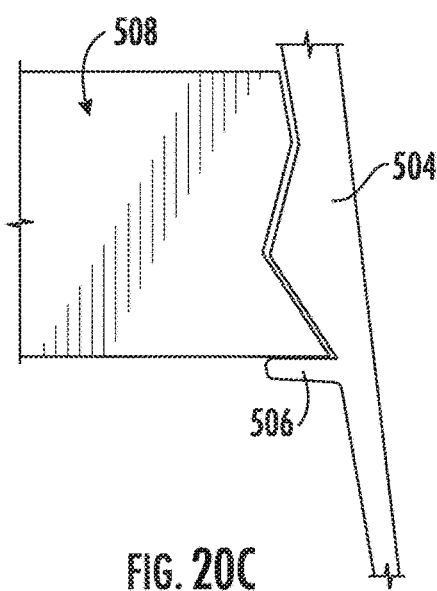
FIG. 20C is a partial side view of another interlocking design between the fuel insert and one of the support legs of the portable grilling system of FIG. 11.
Figure 23A:
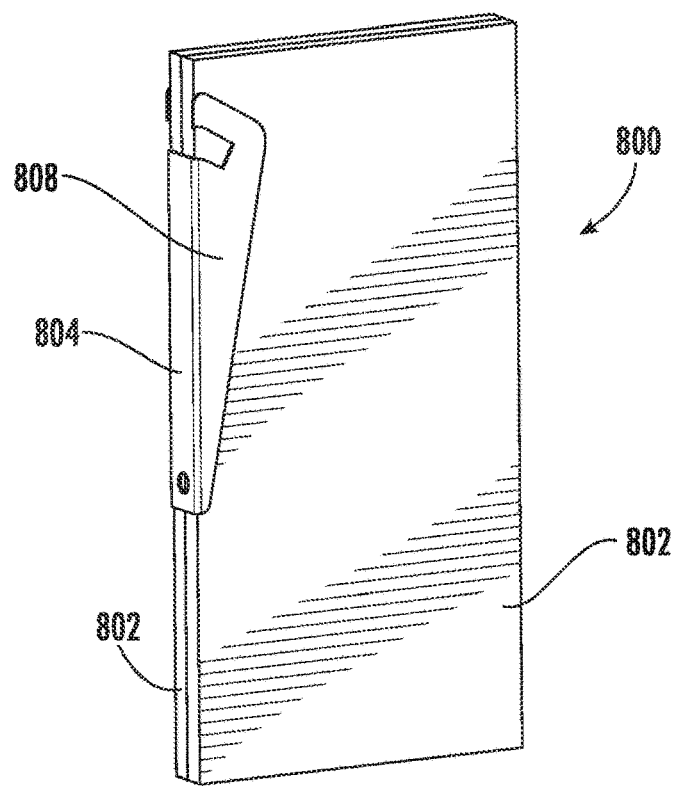
FIG. 23A is a perspective view of plank lifter package usable with the portable grilling systems of FIGS. 1-20C and FIGS. 24-26.
Figure 23B:
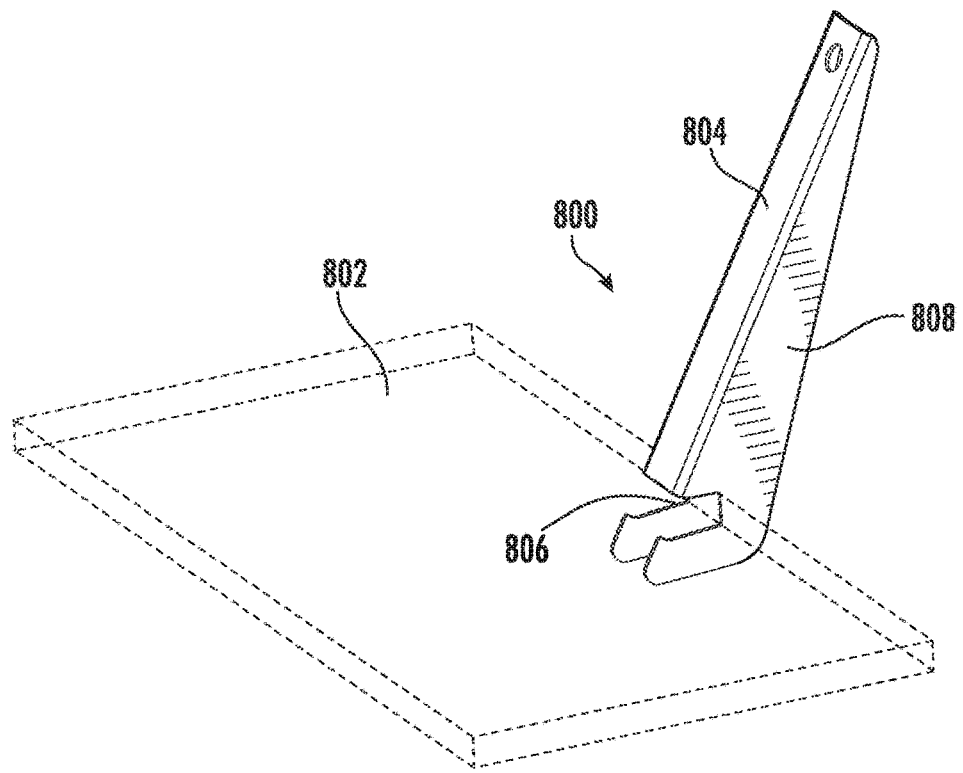
FIG. 23B is a perspective view of the plank lifter of FIG. 23A engaged with a plank.
Figure 23C:
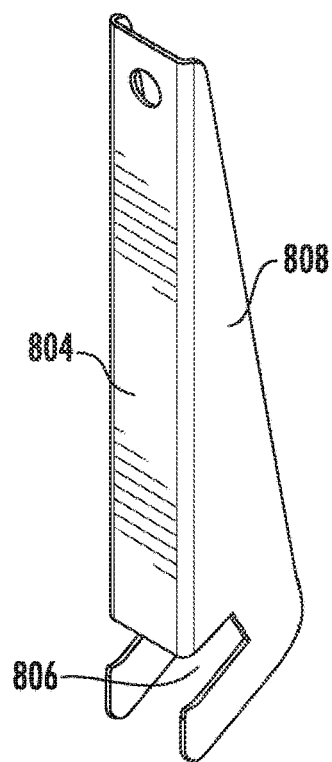
FIG. 23C is a front perspective view of the plank lifter of FIG. 23A.
Figure 23D:
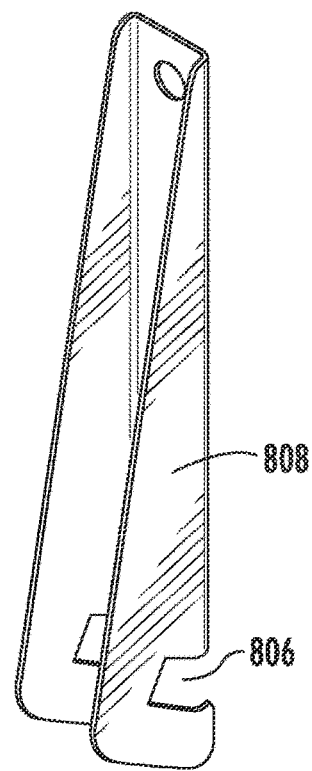
FIG. 23D is a rear perspective view of the plank lifter of FIG. 23A.

The base tray 510 may include an outer portion 510A and an inner portion 510B. The side walls of the outer portion 510A may be shaped such that the base tray 510 mates with the at least two support members 504 to interlock the at least two support members 504 with the grate 502. This results in specifically shaped fuel inserts 508 needing to be used with specifically shaped portable grilling systems 500. For example, as best illustrated in FIG. 20A, the base tray 510 and the at least two support members 504 may feature a "lock-and-key" design. In further embodiments, as best illustrated in FIG. 20B, the base tray 510 may be shaped as a trapezoid such that a mating surface of the base tray 510 interlocks with a mating surface of the at least two support members 504 when the fuel insert 508 is mated with the at least two support members 504. In still further embodiments, as best illustrated in FIG. 20C, the base tray 510 may include an indentation, and the at least two support members 504 may include corresponding extrusions. A person of skill in the art would understand that the mating designs that the base tray 510 and the at least two support members 504 may include but are not limited to these examples. Any suitable shape of the base tray 510 and the at least two support members 504 may be used where the shape of the base tray 510 assists in interlocking the at least two support members 504 and the grate 502 and stabilizes the portable grilling system 500 in the deployed position.

In some embodiments, as best illustrated in FIGS. 21A-23D, the portable grilling system 500 may include tools that can assist the user when cooking with the portable grilling system 500. In some embodiments, the tools may be stowed in receptacles located on the grate, the lid, and/or the support members. In further embodiments, the tools may be stowed in receptacles built into a carrying case for the grilling system.

For example, as best illustrated in FIGS. 21A-21C, the portable grilling system 500 may include a spatula 600. In some embodiments, the spatula 600 may include a handle 602 and at least two tines 604, where the tines are configured to fit between the cross members of the grate 502. The spatula 600 may be made of bamboo, other types of wood, metal, heat-resistant plastic, or any other suitable, heat-resistant, and biodegradable material.

In further embodiments, as best illustrated in FIGS. 22A-22C, the portable grilling system 500 may include tongs 700. The tongs 700 may include at least two arms 702 that may assist the user with gripping food. The tongs may be made out of the same or different materials as the spatula 600.

In still further embodiments, as best illustrated in FIGS. 23A-23D, the portable grilling system 500 may include a plank lifter package 800. The plank lifter package 800 may include a plank lifter 804 and at least one plank 802. The plank lifter 804 may be sized such that the at least one plank 802 may be stored securely between at least two securing members 808. Additionally, the at least two securing members 808 may be spaced such that the at least two securing members 808 may fit between the cross members of the grate 502. The plank lifter 804 may also include a plank opening 806 sized to receive the plank 802. The plank opening 806 may accept the plank 802 and permit the user to easily place the plank 802 onto or remove the plank 802 from the grate 502. The plank lifter 804 may be made out of the same or different materials as the spatula 600.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A portable grilling system comprising:
a grate comprising a non-flammable material;
at least two support members comprising a non-flammable material, wherein at least one of the support members comprises a support member mating surface; and
a fuel insert comprising:
a base tray formed of a biodegradable material having a bottom surface and one or more sidewalls extending upwards from the bottom surface;
a biodegradable and non-flammable lining material positionable within the base tray; and
a fuel source positionable within the lining material;
wherein at least one of the sidewalls comprises a sidewall mating surface that interlocks with the support member mating surface of the at least two support members when the fuel insert is mated with the at least two support members; and
wherein the sidewall mating surface is a portion of a face of the at least one of the sidewalls.

2. The portable grilling system of claim 1, wherein a foot cap is positioned over at least one end of the at least two support members.

3. The portable grilling system of claim 1, wherein the fuel insert interlocks between the at least two support members to stabilize the at least two support members and the grate.

4. The portable grilling system of claim 1, wherein the grate comprises a thermometer at least partially embedded within the grate.

5. The portable grilling system of claim 4, wherein a sleeve is positioned over a neck and a gauge of the thermometer.

6. The portable grilling system of claim 1, wherein the at least two support members comprise extensions that nest within at least one grate opening when the at least two support members are folded against the grate.

7. The portable grilling system of claim 1, wherein the at least two support members are attachable to the grate.

8. The portable grilling system of claim 7, wherein the at least two support members are pivotally attachable to the grate.

9. The portable grilling system of claim 1, further comprising at least one fuel insert support member formed of a non-flammable material and positionable below the grate.

10. The portable grilling system of claim 1, further comprising a lid formed of a non-flammable material and positionable to substantially enclose an upper surface of the grate.

11. The portable grilling system of claim 10, wherein the lid comprises an aperture configured to emit smoke at one end of the grate.

12. The portable grilling system of claim 10, wherein the lid comprises a thermometer at least partially embedded within the lid.

13. A portable grilling system comprising:
a grate comprising a non-flammable material;
at least two support members comprising a non-flammable material, wherein at least one of the support members comprises a support member mating surface;
wherein the at least two support members comprise extensions that nest within at least one grate opening when the at least two support members are folded against the grate; and
a fuel insert comprising:
 a base tray formed of a biodegradable material having a bottom surface and one or more sidewalls extending upwards from the bottom surface;
 a biodegradable and non-flammable lining material positionable within the base tray; and
 a fuel source positionable within the lining material;
 wherein at least one of the sidewalls comprises a sidewall mating surface that interlocks with the support member mating surface of the at least two support members when the fuel insert is mated with the at least two support members.

14. The portable grilling system of claim 13, wherein a foot cap is positioned over at least one end of the at least two support members.

15. The portable grilling system of claim 13, wherein the fuel insert interlocks between the at least two support members to stabilize the at least two support members and the grate.

16. The portable grilling system of claim 13, wherein the grate comprises a thermometer at least partially embedded within the grate, and wherein a sleeve is positioned over a neck and a gauge of the thermometer.

17. The portable grilling system of claim 13, wherein the at least two support members are pivotally attachable to the grate.

18. The portable grilling system of claim 13, further comprising at least one fuel insert support member formed of a non-flammable material and positionable below the grate.

19. The portable grilling system of claim 13, further comprising a lid formed of a non-flammable material and positionable to substantially enclose an upper surface of the grate, and wherein the lid comprises an aperture configured to emit smoke at one end of the grate.

20. The portable grilling system of claim 19, wherein the lid comprises a thermometer at least partially embedded within the lid.

* * * * *